(12) United States Patent
Klotzbach et al.

(10) Patent No.: US 9,790,327 B2
(45) Date of Patent: Oct. 17, 2017

(54) SILICONE RESIN COMPOSITIONS WHICH CAN BE CURED AT ROOM TEMPERATURE

(71) Applicants: Thomas Klotzbach, Seligenstadt (DE); Michael Fiedel, Essen (DE); Michael Ferenz, Essen (DE); Olga Fiedel, Essen (DE); M-Ibrahim Jussofie, Essen (DE); Dirk Hinzmann, Pulheim (DE); Wolfgang Hojak, Essen (DE); Ingrid Eissmann, Gelsenkirchen (DE)

(72) Inventors: Thomas Klotzbach, Seligenstadt (DE); Michael Fiedel, Essen (DE); Michael Ferenz, Essen (DE); Olga Fiedel, Essen (DE); M-Ibrahim Jussofie, Essen (DE); Dirk Hinzmann, Pulheim (DE); Wolfgang Hojak, Essen (DE); Ingrid Eissmann, Gelsenkirchen (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 14/913,426

(22) PCT Filed: Aug. 12, 2014

(86) PCT No.: PCT/EP2014/067212
§ 371 (c)(1),
(2) Date: Feb. 22, 2016

(87) PCT Pub. No.: WO2015/024813
PCT Pub. Date: Feb. 26, 2015

(65) Prior Publication Data
US 2016/0208050 A1 Jul. 21, 2016

(30) Foreign Application Priority Data
Aug. 23, 2013 (DE) .................. 10 2013 216 777

(51) Int. Cl.
 C08G 77/08 (2006.01)
 C08K 5/5465 (2006.01)
 C09D 183/06 (2006.01)
 C08G 77/18 (2006.01)

(52) U.S. Cl.
CPC ............ C08G 77/08 (2013.01); C08K 5/5465 (2013.01); C09D 183/06 (2013.01); C08G 77/18 (2013.01)

(58) Field of Classification Search
CPC .................................................... C08G 77/08
USPC ......................................................... 528/21
See application file for complete search history.

(56) References Cited

U.S. PATENT DOCUMENTS

| 4,248,992 A | 2/1981 | Takago |
| 4,248,993 A | 2/1981 | Takago |
| 4,395,526 A | 7/1983 | White et al. |
| 4,720,531 A * | 1/1988 | Chung ................... C08K 5/544 528/15 |
| 4,734,479 A | 3/1988 | Inoue et al. |
| 6,740,725 B2 * | 5/2004 | Horikoshi ............... C08L 83/14 525/477 |
| 7,053,166 B2 | 5/2006 | Brehm et al. |
| 7,598,334 B2 | 10/2009 | Ferenz |
| 7,605,284 B2 | 10/2009 | Brueckner et al. |
| 7,635,581 B2 | 12/2009 | Ferenz et al. |
| 7,776,989 B2 | 8/2010 | Ferenz et al. |
| 7,825,207 B2 | 11/2010 | Ferenz et al. |
| 7,834,122 B2 | 11/2010 | Ferenz et al. |
| 7,855,265 B2 | 12/2010 | Thum et al. |
| 7,964,694 B2 | 6/2011 | Ferenz et al. |
| 8,030,366 B2 | 10/2011 | Ferenz et al. |
| 8,138,294 B2 | 3/2012 | Henning et al. |
| 8,198,473 B2 | 6/2012 | Ferenz et al. |
| 8,211,972 B2 | 7/2012 | Meyer et al. |
| 8,344,089 B2 | 1/2013 | Frey et al. |
| 8,420,748 B2 | 4/2013 | Henning et al. |
| 8,455,603 B2 | 6/2013 | Ferenz et al. |
| 8,466,248 B2 | 6/2013 | Meyer et al. |
| 8,557,944 B2 | 10/2013 | Henning et al. |
| 8,617,529 B2 | 12/2013 | Herrwerth et al. |
| 8,685,376 B2 | 4/2014 | Czech et al. |
| 8,729,207 B2 | 5/2014 | Hartung et al. |
| 8,778,319 B2 | 7/2014 | Herrwerth et al. |
| 8,802,744 B2 | 8/2014 | Knott et al. |
| 8,841,400 B2 | 9/2014 | Henning et al. |
| 8,883,932 B2 | 11/2014 | Brugger et al. |
| 8,916,511 B2 | 12/2014 | Maurer et al. |
| 8,946,369 B2 | 2/2015 | Henning et al. |
| 8,957,009 B2 | 2/2015 | Schubert et al. |
| 8,993,706 B2 | 3/2015 | Schubert et al. |
| 9,035,011 B2 | 5/2015 | Ferenz |
| 9,315,614 B2 | 4/2016 | Schubert et al. |
| 9,334,354 B2 | 5/2016 | Ferenz et al. |
| 2006/0155090 A1 | 7/2006 | Ferenz |
| 2007/0059539 A1 | 3/2007 | Doehler et al. |
| 2010/0034765 A1 | 2/2010 | Herrwerth et al. |
| 2010/0210445 A1 | 8/2010 | von Rymon Lipinski et al. |

(Continued)

FOREIGN PATENT DOCUMENTS

| EP | 0 069 256 A2 | 1/1983 |
| EP | 0 069 256 A3 | 1/1983 |
| EP | 1 273 618 A1 | 1/2003 |
| EP | 2474573 A1 * | 7/2012 |

OTHER PUBLICATIONS

International Search Report issued Dec. 16, 2014 in corresponding PCT/EP2014/067212.

*Primary Examiner* — Marc Zimmer
(74) *Attorney, Agent, or Firm* — Oblon, McClelland, Maier & Neustadt, L.L.P.

(57) ABSTRACT

The present invention relates to compositions comprising a binder which comprises at least one alkoxy-functional polysiloxane, and at least one crosslinking catalyst, the crosslinking catalyst representing a silicon-containing guanidine compound, and also, optionally, an alkoxysilane as crosslinker.

7 Claims, No Drawings

(56) References Cited

U.S. PATENT DOCUMENTS

| | | |
|---|---|---|
| 2011/0206936 A1* | 8/2011 | Maliverney .......... B01J 31/0251 428/447 |
| 2011/0230619 A1 | 9/2011 | Kuppert et al. |
| 2013/0035409 A1 | 2/2013 | Hubel et al. |
| 2013/0213267 A1 | 8/2013 | Fiedel et al. |
| 2013/0217930 A1 | 8/2013 | Haensel et al. |
| 2013/0259821 A1 | 10/2013 | Henning et al. |
| 2013/0267403 A1 | 10/2013 | von Rymon Lipinski et al. |
| 2013/0331592 A1 | 12/2013 | Hartung et al. |
| 2014/0303065 A1 | 10/2014 | Jazkewitsch et al. |
| 2015/0023900 A1 | 1/2015 | Knott et al. |
| 2015/0057412 A1 | 2/2015 | Knott et al. |

* cited by examiner

SILICONE RESIN COMPOSITIONS WHICH CAN BE CURED AT ROOM TEMPERATURE

The present invention relates to compositions comprising a binder which comprises at least one alkoxy-functional polysiloxane, and at least one crosslinking catalyst, the crosslinking catalyst representing a silicon-containing guanidine compound, and also, optionally, an alkoxysilane as crosslinker.

Long-established binders in the sphere of paint and varnish applications include silicone resin compositions, which can be induced to cure by means of a hydrolysis and condensation mechanism. This is generally accomplished with catalysts which promote the hydrolysis and/or condensation process of the curable groups.

High-temperature applications based on a purely physical drying principle usually necessitate the baking of the paint film at elevated temperatures in order to obtain the necessary chemical and physical stability. This is particularly disadvantageous, since the limitation on oven size means that not all materials can be subjected to forced drying. With increasing size of substrate, moreover, it becomes increasingly difficult to achieve a substrate temperature of the kind required for the baking operation, of generally 150-250° C.

For applications for which curing at room temperature is desirable, particular requirements are imposed on the catalyst. This is the case especially when short curing times are a target, in order to ensure rapid onward processing of the coated substrates.

For the curing of monomers, oligomers or polymers that carry alkoxysilyl groups, suitable catalysts are in principle all those which promote the hydrolysis of the alkoxyfunction and/or the condensation of the resultant silanols. Descriptions of such suitable compounds are found in "Chemie and Technologie der Silicone" (W. Noll, Wiley-VCH Verlag GmbH & Co. KGaA, Weinheim, 1960, p. 161 ff).

Monomers, oligomers or polymers that carry alkoxysilyl groups can be prepared by a variety of reactions; accordingly, not only polyurethanes, polyesters, polyethers and polyacrylates that carry alkoxysilyl groups are known, but also a large number of further polymers that carry alkoxysilyl groups. Known polymers further include those which carry the silanols obtainable from the hydrolysis of alkoxy functions. Such compounds may in turn be silane-based or else may have a pronounced semi-organic or inorganic polymer character, as in the case, for example, of the poly(dimethyl)siloxane oils (PDM siloxanes) or the silicone resins.

As the skilled person is aware, the hydrolysis and condensation reaction of alkoxysilyl functions experiences a reaction maximum in the strongly acidic pH range and in the strongly alkaline pH range. Besides the strong (Lewis) acids and bases, however, other (metal) compounds are known to promote the hydrolysis/condensation, but to date no sufficient clarification has been reached on their precise catalytic mechanism.

WO 2009/106720 (US 2011/040033) discloses metal sulphonates and metal fluoroalkylsulphonates as polycondensation catalysts which cure organopolysiloxane compositions to siloxane elastomers. A great disadvantage of such catalysts is that as well as having a restricted availability and a high price, they cannot be used in the presence of basic components such as amines or basic fillers (e.g. chalks). Moreover, there are often performance drawbacks to using solid catalysts, since they are difficult to meter and/or must be dissolved or dispersed in solvents, in a costly and inconvenient operation. Accordingly, liquid or flowable catalysts, additionally if possible without inherent coloration, and in the form of a 100% active substance, would be extensively preferable in the end-use applications.

The same disadvantage of the unfavourable aggregate state is also possessed by strong Lewis acid catalysts, such as boron halides, metal halides such as $AlCl_3$, $TiCl_4$, $ZrCl_4$, $SnCl_4$, $FeCl_2$ $FeCl_3$ $ZnCl_2$ and/or their amine complexes, which are claimed in EP 2119745 (US 2010/152373). With these compounds, furthermore, their toxicological profile is considered objectionable.

WO 2010/086299 describes moisture-crosslinking reaction mixtures which include polymers that carry trialkoxysilyl groups, and which use niobium compounds and tantalum compounds for catalysis of curing. Such catalysts are considered uneconomical, since their availability on the world market is limited, and the price of the raw material is very high. Similar comments apply to the use of hafnium alkoxides and germanium alkoxides, as described in JP 2004043738 and JP 2006052353, respectively.

WO 2010/117744 (US 2012/022210) discloses the use of superbasic phosphazene catalysts for the condensation of PDM-OH siloxanes. These catalysts, however, display an unfavourable toxicological profile, are uneconomic, and in a multiplicity of applications can therefore not be used or require costly and inconvenient removal and/or aftertreatment.

Less toxicologically objectionable catalyst preparations, such as metal carboxylates in combination with amine compounds, for example, are described in EP 1445287 (US 2004/198885), for example, but display an inadequate curing rate for the binder matrix therein, of up to 5 days. Such long cure times are generally likewise unacceptable for the majority of applications.

Activity as curing catalysts has also been shown by titanates and titanium complexes, but depending on the concentration in which they are used they cause severe yellowing of the curing compositions and in some cases, moreover, also show signs of incompatibility with other components present in the curing composition—amines, for example. The use of titanates for the curing of silicone resin binders is described in citations including EP 1174467 (US 2002/028296) and DE 19934103 (US 2003/068506).

A further considerable disadvantage of metal alkoxides is their severe hydrolytic instability, accompanied by a drop in catalytic performance.

Good curing outcomes without the unwanted side effects described are displayed by organotin compounds. These compounds are well known to the skilled person from the prior art (Alwyn Davis—"Organotin compounds in technology and industry", Journal of Chemical Research, 4, 2010, p. 186, ISBN 0308-2342 and Alwyn G. Davies "Organotin Chemistry", 2004, Wiley-VCH, ISBN 3-527-31023-1, p. 383), but are coming under increasing criticism on a toxicological basis. The use of organotin compounds is therefore highly debated, not least in view of the restrictions placed on them by the amendment to the EU Directive 76/769 EEC of 28 May 2009. Examples of the use of organotin compounds for the curing of siloxanes or siloxane resin binders specifically are found in publications including DE 10319303 (US 2004/220331) and WO 9412586 (U.S. Pat. No. 5,275,645).

It is therefore likely that tin salts as well will be considered more critically from a toxicological standpoint in the future. In principle, then, tin carboxylates are also possible for use as curing catalysts, as shown by WO 0056817 (U.S. Pat. No. 6,703,442).

A component of the disclosure in EP 1563822 (US 2007173557) is the use of what are called superbases, examples being cyclic amidines (DBU) for the curing of dental materials, for which short curing times are desirable.

WO 2009/047580 discloses the utilization of a hybrid catalyst system consisting of a tin compound and an organoguanidine for the curing of compositions comprising long-chain linear siloxanediols, alkoxysilane crosslinkers, fillers and amino silanes. A deficiency of this type of catalysis is that it is not entirely tin-free and is not transposable to a broad silicone resin basis.

In order to ensure sufficiently rapid curing of the catalyst, it is very important that it is soluble in or readily miscible with the binder matrix to be cured, and, furthermore, is thoroughly distributed therein. It is obvious that both the molar mass of the catalyst and its chemical structure have an influence on the solubility/miscibility behaviour.

A feature of many of the approaches described in the prior art to the catalysis of alkoxysilyl curing are unwanted properties, which hinder broad applicability. For instance, they are uneconomic, exhibit inadequate curing rates, display unwanted migration effects that cause a poor surface appearance to the curing compositions, or are toxicologically objectionable.

There was therefore a shortage of catalysts which promote alkoxysilyl curing and which lead at room temperature to a good curing outcome within a sufficiently short time, and, moreover, which are adjustable in their solubility/miscibility in the system to be cured, owing to their chemical nature and topology.

It was an object of the present invention, therefore, to find heavy metal-free or less toxicologically objectionable curing catalysts that accelerate the curing of alkoxy-functional silicone resins.

Surprisingly it has been found that at least one drawback of the prior art can be overcome by means of specific silicon-containing guanidine compounds.

The present invention accordingly provides compositions comprising as component (a) a binder which comprises at least one alkoxy-functional polysiloxane, and as component (b) at least one crosslinking catalyst which is a silicon-containing guanidine compound, as described in the claims.

The compositions of the invention have the advantage that in the curing of alkoxy-functional polysiloxanes they display a much better curing outcome by comparison with organically modified guanidine derivatives, and also display further significant performance advantages.

Likewise provided with the present invention is the use of the compositions of the invention as coating material.

The present invention further provides a method for curing compositions comprising as component (a) a binder which comprises at least one alkoxy-functional polysiloxane, and as component (b) at least one crosslinking catalyst, as described in the claims, this method being carried out at room temperature.

One advantage of the method is that the curing of the alkoxy-functional polysiloxanes does not necessitate forced drying and hence is associated with a saving in energy. With this, in particular, one drawback for large components is overcome, for which corresponding drying units are difficult to realize, examples being aircraft parts or turbine parts.

A further advantage of the compositions of the invention is that in high-temperature applications of the coated components, they decompose without residue, or else at least the residues are compatible with the binder film, meaning that a flawless surface is maintained.

Yet a further advantage of the compositions of the invention is that component (b), depending on its topology and density of functionality, brings about the curing at room temperature within a few hours not only of pure alkyl resin formulations, but also that those siloxane resins which have both methyl and phenyl radicals can be cured without problems.

The word fragment "poly", in the context of this invention, encompasses not only exclusively compounds having at least three repeating units of one or more monomers in the molecule, but also, in particular, those compositions of compounds that have a molecular weight distribution and possess an average molecular weight of at least 200 g/mol. This definition accounts for the circumstance that within the field of art in question it is common to identify such compounds as polymers even when they do not yet appear to satisfy the definition of a polymer as per OECD or REACH guidelines.

Alkoxy-functional in the sense of the present invention means that in the polysiloxane there are alkyl groups bonded to silicon via oxygen (Si—O—R groups). Also understood synonymously in the context of the present invention are hydroxyl groups (Si—OH groups). Preferably, alkoxy-functional implies the presence of Si—O—R groups.

Within the scope of the invention, alkylpolysiloxane is understood to encompass compounds which as well as Si—C linked alkyl groups may also contain other Si—C linked groups. This definition should also be applied, mutatis mutandis, to terms such as methylpolysiloxane and methyl resin, even when these terms are components of further terms. The siloxanes Si—C linked exclusively with methyl groups are referred to as permethylsiloxane.

The compositions of the invention comprise preferably as component (a) at least one alkoxy-functional polysiloxane of the general formula (II):

$$R_a Si(OR')_b O_{(4-a-b)/2} \qquad (II)$$

in which a and b independently of one another are greater than 0 to less than 2, and the sum of a+b is less than 4, and R independently of one another are identical or different and are linear or branched, saturated or else mono- or polyunsaturated or aromatic hydrocarbon radicals, and
R' independently of one another are identical or different and are an alkyl group consisting of 1 to 8 carbon atoms.

Preferably the radicals R, independently of one another, are saturated, branched or unbranched alkyl radicals having 1 to 20 carbon atoms and/or are mono- or polyunsaturated, branched or unbranched alkenyl radicals having 2 to 20 carbon atoms, or aromatic groups having 6 to 12 carbon atoms. More preferably the alkyl and alkenyl radicals have up to 12, more preferably up to 8, carbon atoms. With more particular preference, all radicals R are methyl and/or phenyl.

Preferred radicals R' are methyl, ethyl, propyl, isopropyl, n-butyl, sec-butyl or tert-butyl groups. R' is preferably selected from methyl or ethyl groups. The latter are especially suitable for phenylpolysiloxanes or phenyl alkylpolysiloxanes which are identified as HAPS-free (Hazardous Air Pollutant Substance-free), which do not contain solvents such as toluene, xylene or benzene and also, on the catalytic hydrolysis-condensation crosslinking that occurs at room temperature, do not release any methanol, but instead only ethanol.

Compounds of the formula (II) are frequently also referred to as silicone resins. This formula relates to the smallest unit of the averaged structural formula of the silicone polymer. The number of repetitions is evident from the number average $M_n$, as determined via GPC.

The preparation of silicone resins of these kinds is long-established in the literature (in this regard, see W. Noll—

Chemie and Technologie der Silicone, Wiley-VCH Verlag GmbH & Co. KGaA, Weinheim, 1960), and is also described in German Patent specification DE 34 12 648.

Particularly preferred alkoxy-functional polysiloxanes of the general formula (II) have methyl and/or ethyl groups as radical R, with 10 to 70 wt % alkoxy functionality, preferably 20 to 40 wt %, more preferably 30 to 40 wt %, based on the total mass of the resin.

The molecular weight $M_w$ of the alkoxy-functional polysiloxanes is preferably 50 to 200 000 g/mol, more preferably 100 to 50 000 g/mol, more preferably still 200 to 3000 g/mol, very preferably 300 to 2000 g/mol.

Especially preferred are the alkoxy-functional polysiloxanes of the formula (II) with R as methyl, known as methyl resins, having an alkoxy functionality of 20 to 40 wt %, based on the total mass of the resin, and having a weight-average molar mass of 300 to 3000 g/mol.

In a further preferred embodiment of the compositions of the invention, component (a) is an alkoxy-functional phenyl alkylpolysiloxane, of the type referred to as phenyl-alkyl resins.

The molecular weight $M_w$ with the phenyl-alkyl resins is preferably 50 to 200 000 g/mol, preferably 1000 to 50 000 g/mol, more preferably 1500 to 3500 g/mol.

More preferably the molecular weight $M_n$ of the phenyl-alkyl resins is 700 to 1200 g/mol.

Further especially preferred are the alkoxy-functional polysiloxanes of formula (II) with R being methyl and phenyl, known as methyl-phenyl resins, having an alkoxy functionality of 5 to 10 wt %, based on the total mass of the resin, and having a weight-average molar mass of 1000 to 5000 g/mol.

More particularly preferred methyl-phenyl resins have methoxy and/or ethoxy groups as alkoxy groups, with the fraction of the alkoxy groups, more particularly of the methoxy and/or ethoxy groups, being at least 10 wt %, based on the polysiloxane, preferably 10 to 40 wt %, more preferably 10 to 30 wt %, very preferably 13 to 25 wt %.

The numerical phenyl to methyl ratio, based on the number of moles in the resin, is generally in the range from 1:0.1 to 0.1:1, preferably in the range from <0.5:1 to 1:1.

In another preferred embodiment of the compositions of the invention, component (a) comprises phenyl(alkoxysiloxanes) (phenylsilicone resins) where R is phenyl, known as phenyl resins.

The phenyl resins preferably have a fraction of alkoxy groups of at least 5 wt %, based on the polysiloxane, preferably 10 to 70 wt %, more preferably 10 to 40 wt %, and very preferably 15 to 28 wt %.

With further preference, the molecular weight $M_w$ of the phenyl resins is 50 to 10 000 g/mol, preferably 200 to 3000 g/mol, more preferably 800 to 1700 g/mol.

More preferably the molecular weight $M_n$ of the phenyl resins is 700 to 900 g/mol.

Especially preferred are the phenyl resins having an alkoxy functionality of 10 to 30 wt %, based on the total mass of the resin, and having a weight-average molar mass of 1000 to 5000 g/mol.

Especially preferred are alkoxy-functional polysiloxanes of the general formula (II) in which the radicals R are methyl and/or phenyl radicals, and the radicals R' are ethyl radicals.

The compositions of the invention further optionally comprise as component (c) a crosslinker, the crosslinker more particularly being an alkoxysilane.

Preference is given to the crosslinkers of the formula (III):

  formula (III)

in which a and b independently of one another are greater than 0 to less than 2, and the sum of a+b is 4, and R is an alkyl group or cycloalkyl group consisting of 1 to 8 carbon atoms, or an aromatic moiety having 6 to 20 carbon atoms, and R' is an alkyl group consisting of 1 to 8 carbon atoms.

Preferably R is an alkyl group consisting of 1 to 8 carbon atoms, or an aromatic moiety having 6 to 20 carbon atoms. Alkyl groups are preferably methyl, ethyl, propyl, isopropyl, n-butyl, sec-butyl and tert-butyl groups. The aromatic moiety is preferably a phenyl moiety. Preferred substituents R are methyl or phenyl radicals, or mixtures of methyl and phenyl radicals.

Preferred alkyl groups of the radical R' are methyl, ethyl, propyl, isopropyl, n-butyl, sec-butyl and tert-butyl groups.

In particular, the radicals R and R' in the formulae (II) and (III) may be selected independently of one another.

Compositions of two or more components (c) are frequently understood in the prior art to constitute a monomer blend. A suitable example is a mixture of about 67 wt % phenyltrimethoxysilane and about 28 wt % methylphenyldimethoxysilane, as a monomer blend in the sense of the present invention.

Suitability as crosslinkers is possessed preferably by alkoxysilanes such as tetramethoxysilane, tetraethoxysilane, phenyltriethoxysilane, phenyltrimethoxysilane, cyclohexyltrimethoxysilane, cyclohexyltriethoxysilane, cyclohexylmethyldimethoxysilane, cyclohexylmethyldiethoxysilane, propyltrimethoxysilane, propyltriethoxysilane, dimethyldimethoxysilane, dimethyldiethoxysilane, dimethoxyphenylmethylsilane and diethoxyphenylmethylsilane.

Particularly preferred crosslinkers are tetramethoxysilane, tetraethoxysilane, phenyltriethoxysilane, phenyltrimethoxysilane and dimethoxyphenylmethylsilane.

The compositions of the invention comprise component (c) in amounts of 10 to 80 wt %, preferably 20 to 60 wt % and more preferably at 30 to 50 wt %, based on the sum of component (a) and component (c).

All above-described resins which do not already on their own account have a sufficiently high alkoxy functionality, to make the fraction of alkoxy groups at least 10 wt %, based on the sum of components a) and c), must be admixed by combination with further alkoxysilanes as component c). In one embodiment of the present invention, accordingly, the resins of component a) have an alkoxy groups fraction of more than 10 wt %, and need therefore not necessarily be admixed with alkoxysilanes of component c). Where the fraction of alkoxy groups in the resins is less than 10 wt %, it is necessary to add at least one alkoxysilane as component c), until the fraction of the alkoxy groups is at least 10 wt %, based on the sum of components a) and c).

In this way, the catalysed chemical crosslinking through hydrolysis-condensation reactions that occurs at room temperature and at a relative humidity in the 5-100% range occurs with a sufficiently high rate and leads to coatings with a high hardness, which is unachievable with silicone resin coatings that only dry physically.

The compositions of the invention preferably comprise as component (b) at least one crosslinking catalyst, the crosslinking catalyst being a silicon-containing guanidine compound of the formula (IV),

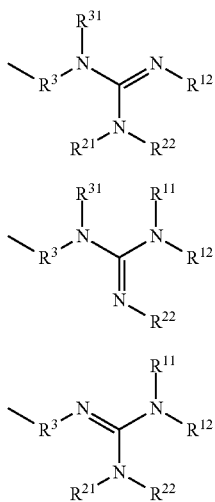

formula (IVa)

formula (IVb)

formula (IVc)

where
R³ are divalent radicals which, independently of one another, are identical or different linear or branched hydrocarbon radicals containing 1 to 50 carbon atoms, and which may be interrupted by heteroatoms, preferred heteroatoms being oxygen, nitrogen or sulphur, and/or which may be substituted one or more times by hydroxyl or amino radicals, $R^{11}$, $R^{12}$, $R^{21}$, $R^{22}$, $R^{31}$ independently of one another, are identical or different and are hydrogen, linear or branched or cyclic hydrocarbons containing 1 to 15 carbon atoms, it being possible for the hydrocarbons also to contain 1 or 2 heteroatoms, preferred heteroatoms being nitrogen, oxygen and silicon, and where a silicon compound is bonded to R³ via an Si atom.

The compositions of the invention further preferably comprise as component (b) at least one crosslinking catalyst of the formula (I)

$$M_a M^G_b D_c D^G_d T_e Q_f \quad (I)$$

a=0 to 10, preferably 0 to 5, more preferably greater than 0 to 4, especially preferably greater than 1 to less than 3,
b=0 to 10, preferably 0 to 5, more preferably greater than 0 to 4, especially preferably greater than 1 to less than 3,
c=0 to 350, preferably 1 to 150, more preferably greater than 1 to 15, very preferably 2 to 10, especially preferably greater than 2 to 5,
d=0 to 50, preferably 1 to 25, more preferably greater than 1 to 10, very preferably 2 to 8, especially preferably greater than 2 to 5,
e=0 to 50, preferably 0 to 30, more preferably 0 to 10, very preferably greater than 1 to 5, especially preferably 2 to less than 4,
f=0 to 10, preferably greater than 0 to 5, more preferably 0 to less than 5, especially preferably greater than 1 to less than 3,
where the sum of the indices b and d is greater than or equal to 1 to 20, preferably greater than 1 to 15, especially preferably 2 to 10,
with the proviso that when the index a is 2 and at the same time the sum of the indices b, c, e and f is zero, the index d is other than 1,
or with the proviso that when the sum of the indices a, c, d, e and f is zero, the index b is greater than 1, preferably 2, especially preferably greater than 2, $M=[R_3SiO_{1/2}]$,
$M^G=[R^G R_2 SiO_{1/2}]$,
$D=[R_2SiO_{2/2}]$,
$D^G=[R^G R SiO_{2/2}]$,
$T=[RSiO_{3/2}]$,
$Q=[SiO_{4/2}]$, R are, independently of one another, identical or different and are $OR^a$ groups and/or linear or branched, saturated or else mono- or polyunsaturated hydrocarbon radicals, which may be interrupted by heteroatoms and/or may be substituted one or more times by hydroxyl, amino, carboxyl or aryl radicals,
preferably being substituted by amino radicals,
preferred hydrocarbon radicals, which may be optionally substituted by hydroxyl and amino radicals, are polyethers, alkyl radicals or aryl radicals,
more preferably alkyl or aryl radicals,
more preferably still alkyl radicals,
especially methyl or propyl radicals,
and the aryl radicals may also be substituted by $C_1$-$C_8$ alkyl radicals,
$R^a$ is identical or different and is hydrogen and/or alkyl groups having 1 to 12 carbon atoms, more particularly methyl or ethyl,
$R^G$ is a radical which contains guanidine groups and is of the formula (IVa), (IVb) or (IVc), the tautomers and/or salts thereof,

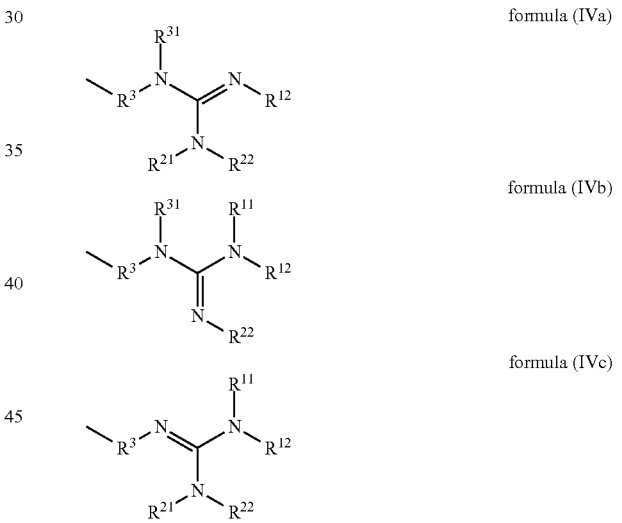

formula (IVa)

formula (IVb)

formula (IVc)

R³ are divalent radicals which, independently of one another, are identical or different, linear or branched hydrocarbon radicals containing 1 to 50 carbon atoms, preferably 2 to 20, more preferably 3 to 10, especially preferably more than 3 to 8, which may be interrupted by heteroatoms, preferred heteroatoms being oxygen, nitrogen or sulphur, and/or which may be substituted one or more times by hydroxyl or amino radicals,
more preferably the hydrocarbon radical is a propylene radical;

$R^{11}$, $R^{12}$, $R^{21}$, $R^{22}$ and $R^{31}$ are, independently of one another, identical or different and are hydrogen, linear or branched or cyclic hydrocarbons containing 1 to 15 carbon atoms, preferably more than 1 to 10, especially 2 to 7, it also being possible for the hydrocarbons to contain 1 or 2 heteroatoms, preferred heteroatoms being nitrogen, oxygen and silicon.

In particularly preferred crosslinking catalysts, the radicals $R^{11}$, $R^{12}$, $R^{21}$ and $R^{22}$ in the formula (IVc) are all hydrogen or methyl, more preferably all methyl.

In further particularly preferred crosslinking catalysts, the radicals $R^{12}$ and $R^{22}$ in the formula (IVc) are identical only if the radicals $R^{11}$ and $R^{21}$ are both identical to hydrogen.

Preferred radicals $R^{11}$, $R^{12}$, $R^{21}$ and $R^{22}$ in the formula (IVc) are methyl, ethyl, propyl, isopropyl, butyl, tert-butyl, cyclohexyl, phenyl, 4-nitrophenyl, p-tolyl, trimethylsilyl, 2-morpholinoethyl, 3-dimethylaminopropyl or hydrogen. Particularly preferred radicals are ethyl, isopropyl or cyclohexyl, especially preferably methyl and cyclohexyl.

With further preference the radicals $R^{12}$ and $R^{22}$ in the formula (IVc) are identical.

More preferably the radicals $R^{12}$ and $R^{22}$ in the formula (IVc) are identical and are ethyl, isopropyl or cyclohexyl; with more particular preference, the radicals $R^{12}$ and $R^{22}$ are identical and are cyclohexyl.

Preference is given to siloxanes of formula (I) containing guanidine groups; where the indices a, b, e and f adopt a value of zero, the sum of the indices c+d is from 3 to 8, preferably greater than 3 to 6, more preferably 4 to less than 6, especially preferably 4 to 5.

Preference is given to siloxanes of formula (I) containing guanidine groups; where the indices a, b, e and f adopt a value of zero, the index d is 1 to 4, preferably greater than 1 to less than 4.

In the context of the invention, the silicon-containing crosslinking catalysts used as component (b) are understood to be not metal-containing. Silicon is a semi-metal; regarding the definition, reference may be made to "Lehrbuch der anorganischen Chemie", Holleman Wiberg, 100th edition, 1985, page 733; regarding the definition of heavy metals, reference may be made to the Römpp-online Lexicon under the eponymous entry heading.

The different fragments of the siloxane chains indicated in the formula (I) and (II) may be statistically distributed. Statistical distributions can be blockwise in structure with any desired number of blocks and any desired sequence or be subject to a randomized distribution, they can also have an alternating structure or else form a gradient via the chain, in particular they can also form all mixed forms in which optionally groups of different distributions can follow one another. Specific embodiments can lead to the statistical distributions experiencing limitations due to the embodiment. For all regions which are not affected by the limitation, the statistical distribution is not changed.

The index numbers reproduced here and the value ranges for the indices indicated may be understood as average values of the possible statistical distribution of the structures and/or mixtures thereof that are actually present. This applies equally to structural formulae which as such are reproduced exactly per se, such are for formula (I) and formula (II), for example.

The compositions of the invention comprise component (b) at 0.001 to 10 wt %, preferably 0.01 to 5 wt %, more preferably 0.1 to 3.0 wt %, based on the overall composition.

Based on the sum of the components (a) and (c), the compositions of the invention comprise component (b) at 0.01 to 10 wt %, preferably 0.1 to 5 wt %, especially preferably 0.5 to 3 wt %.

Preferred compositions of the invention comprise component (a) at 70 to 99.9 wt %, preferably at 80 to 97.5 wt %, more particularly at 90 to 95 wt %, component (c) at 0 to 70 wt %, preferably at 10 to 50 wt %, more particularly at 20 to 35 wt %, and component (b) at 0.001 to 10 wt %, preferably at 0.01 to 5 wt %, more preferably at 0.1 to 3 wt %, more particularly at 0.5 to 3.0 wt %, the sum totals of the stated fractions making 100 wt %.

The stated alkoxy-functional alkylpolysiloxanes may be present either in the form of solvent-free resin, known as 100% resin, or else in the form of a corresponding resin solution, particularly in the case of the alkoxy-functional methyl-phenyl resins, as for example methoxy-functional methyl-phenyl resins, but also ethoxy-functional methyl-phenyl resins. The solvent in question is preferably xylene, toluene, butyl acetate or methoxypropyl acetate.

Through the addition of corresponding solvents it is possible to reduce the viscosities of the alkoxy-functional polysiloxanes to the point that they are easier to handle for the preparation of coating systems.

In the case of methoxy-functional methyl-phenyl resins, the resin solutions have a silicone resin content more particularly of 30 to 99.99 wt %, preferably 60 to 99 wt %, more preferably 80 to 95 wt %, based on the solution. In the case where resin solutions are used, the molecular weight $M_w$ of the methoxy-functional methyl-phenyl resins is more particularly 50-200 000 g/mol, preferably 3000-120 000 g/mol and more preferably 4000-70 000 g/mol.

In the case of resin solutions of ethoxy-functional phenylmethylpolysiloxane resins, the solids content is in the range of 50-99.99 wt %, preferably 80-99 wt % and more preferably 90 wt %, based on the resin solution. The fraction of alkoxy groups in this case is especially 10-70 wt %, preferably 10-30 wt %, more preferably 10-15 wt %. The molecular weight $M_w$ in this case is especially 50-10 000 g/mol, preferably 200-8000 g/mol, more preferably 500-2000 g/mol.

The compositions of the invention may comprise further additives. Preferred additives of the compositions of the invention may be selected from the group of diluents, metal-free catalysts, plasticizers, fillers, solvents, emulsifiers, adhesion promoters, rheology additives, additives for chemical drying, and/or stabilizers against thermal and/or chemical exposures and/or exposures to ultraviolet and visible light, thixotropic agents, flame retarders, blowing agents or defoamers, deaerating agents, film-forming polymers, antimicrobial and preservative substances, antioxidants, dyes, colorants and pigments, anti-freeze agents, corrosion inhibitors, fungicides, reactive diluents, complexing agents, wetting agents, co-crosslinkers, spraying assistants, active pharmacological ingredients, fragrances, radical scavengers and/or other adjuvants. The skilled person is also aware that owing to the different fraction of organic radicals as a proportion of the resin structure, methyl resins and methyl/phenyl resins exhibit differences in compatibility with pigments or fillers. Thus, for example, a resin structure which carries phenyl/methyl groups has much greater miscibility with organic pigments or molecules than pure methyl resin.

Suitable solvents may be selected from the group of alkanes, alkenes, alkynes, benzene and aromatics with aliphatic and aromatic substituents, which in turn may also be saturated one or more times, carboxylic esters, linear and cyclic ethers, molecules with an entirely symmetrical construction, such as tetramethylsilane or, analogously, carbon disulphide, and at high pressures carbon dioxide as well, halogenated aliphatic or aromatic hydrocarbons, ketones or aldehydes, lactones such as γ-butyrolactone, for example, lactams such as N-methyl-2-pyrrolidone, for example, nitriles, nitro compounds, tertiary carboxamides such as N,N-dimethylformamide, for example, urea derivatives such as tetramethylurea or dimethylpropyleneurea, sulphoxides such as dimethylsulphoxide, sulphones, such as sulpholane, carbonic esters such as dimethyl carbonate, ethylene carbonate or propylene carbonate. Mention may also be made of protic solvents such as butanol, methanol, ethanol, n- and isopropanol, and other alcohols, primary and secondary amines, carboxylic acids, primary and secondary amides such as formamide, and mineral acids.

Suitable fillers may be selected from inorganic pigments such as metal oxides (such as titanium dioxide), for example, or spinel pigments; platelet-shaped mica pigments.

Suitable corrosion inhibitors are zinc phosphates, for example.

Preferred compositions of the invention comprise component (a) at 20 to 90 wt %, preferably at 30 to 75 wt %, more particularly at 40 to 60 wt %, component (c) at 0 to 60 wt %, preferably at 10 to 50 wt %, more particularly at 20 to 35 wt %, and component (b) at 0.001 to 10 wt %, preferably at 0.01 to 5 wt %, more preferably at 0.1 to 3 wt %, more particularly at 0.5 to 3.0 wt %, and also further additives, especially pigments at 0 to 50 wt %, preferably 3 to 30 wt %, more particularly 5 to 15 wt %, more particularly fillers, such as mica for example, at 0 to 50 wt %, preferably 3 to 30 wt %, more particularly 5 to 20 wt %, and also yet further additives, based on the sum of all the components.

Metal-containing catalysts which promote the curing of compounds containing alkoxysilyl groups are well known to the skilled person. The following examples may be given: tin compounds such as tin diacetate, tin dioctoate, dibutyltin diacetylacetonate, dibutyltin dilaurate, tin tetraacetate, dibutyltin diacetate, dibutyltin dioctoate, dibutyltin dioleate, dimethoxydibutyltin, dimetyltin, dibutyltin benzylmaleate, bis(triethoxysiloxy)dibutyltin, diphenyltin diacetate, titanium compounds, such as tetraethoxytitanium, tetra-n-propoxytitanium, tetraisopropoxytitanium, tetra-n-butoxytitanium (TnBT), tetraisobutoxytitanium, tetrakis(2-ethylhexoxy)titanium, diisopropoxybis(ethyl acetoacetato) titanium, dipropoxybis(acetylacetonato)titanium, diisopropoxybis(acetylacetonato)titanium, dibutoxybis (acetylacetonato)titanium, triisopropoxyallyltitanium acetate, isopropoxyoctylene glycol or bis(acetylacetonato) titanium oxide, metalloaliphatic compounds, such as lead diacetate, lead di-2-ethylhexanoate, lead dineodecanoate, lead tetraacetate, lead tetrapropionate, zinc acetylacetonate, zinc 2-ethylcaproate, zinc diacetate, bis(2-ethylhexanoic acid) zinc, zinc dineodecanoate, zinc diundecenoate, zinc dimethacrylate, tetrakis(2-ethylhexanoic acid) zirconium dichloride, tetrakis(methacrylic acid) zirconium dichloride, cobalt diacetate. Use may also be made, furthermore, of bismuth catalysts, such as the Borchi catalyst, iron(II) and iron(III) compounds, such as iron(III) acetylacetonate or iron diacetate, aluminium compounds, such as aluminium acetylacetonate, calcium compounds, such as calcium ethylenediaminetetraacetate, or magnesium compounds, such as magnesium ethylenediamine tetraacetate, for example.

Nitrogen-containing compounds from the group of the amines, amidines or guanidines, such as triethylamine, tributylamine, aminopropyltrimethoxysilane, N-(2-aminoethyl)-3-aminopropyltrimethoxysilane, tetramethylguanidine or 1,4-diazabicyclo[2.2.2]octane, 1,8-diazabicyclo[5.4.0]undec-7-ene, 1,5-diazabicyclo[4.3.0]non-5-ene, N,N-bis(N,N-dimethyl-2-aminoethyl)methylamine, N,N-dimethylcyclohexylamine, N,N-dimethyl-phenylamine, N-ethylmorpholine, etc., may likewise be used as catalysts. Likewise catalytically active are tetraalkylammonium compounds, such as N,N,N-trimethyl-N-2-hydroxy-propylammonium hydroxide, N,N,N-trimethyl-N-2-hydroxypropylammonium 2-ethylhexanoate or choline 2-ethylhexanoate. Organic or inorganic Brønsted acids such as methanesulphonic acid, p-toluenesulphonic acid, dodecylbenzenesulphonic acid, 1-naphthalenesulphonic acid, camphorsulphonic acid, acetic acid, trifluoroacetic acid or benzoyl chloride, hydrochloric acid, phosphoric acid, the monoesters and/or diesters thereof, such as butyl phosphate, (iso)propyl phosphate and dibutyl phosphate, etc., for example, are suitable catalysts as well. Inorganic and organic Brønsted bases as well, such as sodium hydroxide, tetramethylammonium hydroxide, potassium hydroxide or tetrabutylammonium hydroxide, are also suitable as catalysts. It is of course also possible to employ combinations of two or more catalysts.

Also known as curing catalysts are what are called photolatent bases, of the kind described in WO 2005/100482. Photolatent bases are preferably organic bases having one or more basic nitrogen atoms, which initially are present in a blocked form and which release the basic form only on irradiation with UV light, visible light or IR radiation, through splitting of the molecule.

Also catalytically active are catalysts which are sold by Dorf Ketal (formerly Du Pont) under the commercial designation Tyzor®. The same applies to catalysts of the Kenreact® (Kenrich), Borchi Kat® (Borchers) and K-Cure®/Nacure® (King Industries) types.

In accordance with the invention, the components are optionally combined with the optional auxiliaries and adjuvants and are processed in accordance with the customary methods for producing liquid paints. In this procedure, the polysiloxanes (a), given sufficient alkoxy functionality, are combined either on their own, as component (a), or in combination with alkoxysilanes (c), with optional additives. Additives here are usually colour-imparting pigments, fillers, thixotropic agents and solvents, which are added in succession with stirring for producing the coating system, in other words, more particularly, the ink or the paint, and which following preliminary dispersion with a dissolver, are subsequently subjected to fine dispersing using an agitator ball mill. Grinding on a bead mill disrupts the pigment agglomerates, in order thus to maximize the fine division of the pigments and the tinctorial strength. In the case of a one-component system, the crosslinking catalyst (b) may be added either during letdown, in other words at the end of the paint preparation process, shortly before the paint is dispensed into the transport containers, or else the catalyst is added directly prior to the application of the coating system, as a second component. Whether a coating material is employed preferably as a one-component or two-component system is dependent generally on the combination of the individual raw materials in the formula, and can be tested expertly for each formula by means of storage stability tests.

The coating system of the invention is applied generally by spray application, though it may also be applied by other techniques such as, for example, brushing, rolling, flow coating, dipping, spreading or pouring. Suitable substrates are metallic substrates such as steel, cast steel, stainless steel, aluminium, cast aluminium or hot dip galvanized steel, for example. For improved adhesion, the substrate may be roughened by sandblasting or sanding. Non-metallic substrates such as glass or ceramics may also be employed.

The coating system of the invention that is applied to the substrate then cures with ingress of atmospheric moisture, through a catalysed hydrolysis-condensation crosslinking process. Combined forced drying at elevated temperature and accompanying chemical crosslinking through hydrolysis-condensation with introduction of sufficient moisture into the oven are not mutually exclusive. A further advantage of such coating systems with added catalyst is that in closed containers they are not subject to any pot life problems, since curing occurs only in the presence of water from the surrounding atmospheric moisture. In contrast to the conventional, purely physically drying, silicone resin-based coating systems, which must be baked at substrate temperatures of 250° C. for at least 30 minutes in order to achieve their full mechanical and chemical stability, a complete saving can be made here on the oven drying energy. The coating systems produced from the coating materials of the invention cure fully by chemical crosslinking even at room temperature.

It is found here to be particularly advantageous that the catalysts have usually been compatible and homogeneously soluble in the matrices to be cured.

The curing rates achieved exceeded the prior art as known, for example, from curing experiments with titanates. A particular advantage is that the compositions of the invention have a hard surface within 24 hours.

A further particular advantage over the prior art has proved to be that by substituent exchange on the crosslinking catalyst it has been possible to bring about the desired compatibility not only, for example, in phenyl-/methyl-silicone resins, but also in the methyl-silicone resins, which are usually less compatible.

Another advantage of the crosslinking catalysts for use is that their improved homogeneous distribution within the coating systems to be cured means that quicker through-cure times are achievable.

A further advantage is that the crosslinking catalysts for use are considered much more highly than the toxicologically objectionable catalysts, such as organotin compounds, for example.

Methods for the curing of the compositions of the invention, where the method is carried out at room temperature and without addition of metal-containing catalysts.

The method of the invention is preferably carried out using moisture.

There are preferably no tin-containing catalysts used in the method of the invention.

In accordance with the method, curing is at an end within 24 hours, more preferably within 12 hours, more preferably still within 6 hours, and particularly preferably within 2 hours, and more particularly within 1 hour.

The method of the invention is especially advantageous in the curing of polysiloxanes containing aryl groups, which according to the prior art are very difficult to cure.

An advantage of the method of the invention is that the coating has formed a hard surface within 24 hours, irrespective of the resin used.

The method of the invention is particularly advantageous in that polysiloxanes containing aryl groups cure within 12 hours.

The method of the invention is also particularly advantageous in the curing of resins substituted exclusively by alkyl groups, preferably exclusively methyl-group-substituted resins, since these resins cure—that is, form a hard surface—within 3 hours without addition of a further catalyst, more particularly without addition of tin-containing compounds.

Registered commercial names used:
Dynasylan® is a registered trademark of Evonik Industries AG, Essen (DE).
Lewatit® with product name K 2621 is a registered trademark of LANXESS Deutschland GmbH, Leverkusen (DE).
Tyzor® is a registered trademark of Dorf Ketal (formerly Du Pont).
Kenreact® is a registered trademark of Kenrich Petrochemicals Inc., Bayonne (USA).
Borchi Kat® is a registered trademark of Borchers, Langenfeld (DE).
K-Cure® and Nacure® are registered trademarks of King Industries, Waddinexveen (the Netherlands).

The compositions of the invention, their use in accordance with the invention, and the method of the invention are described on an example basis below, without any intention that the invention should be confined to these exemplary embodiments. Reference below to ranges, general formulae or classes of compound should be taken to encompass not only the corresponding ranges or groups of compounds that are explicitly mentioned, but also all subranges and sub-groups of compounds that may be obtained by extracting individual values (ranges) or compounds. Where documents are cited in the context of the present description, it is intended that their content fully form part of the disclosure content of the present invention. Where % figures are given below, they are figures in weight % unless otherwise indicated. In the case of compositions, the % figures, unless otherwise indicated, are based on the overall composition. Where average values are reported below, the averages in question are mass averages (weight averages), unless otherwise indicated. Where measurement values are reported below, these measurement values, unless otherwise indicated, have been determined under a pressure of 101 325 Pa and at a temperature of 25° C., and with the surrounding relative atmospheric humidity being approximately 40%.

EXAMPLES

General Methods and Materials

| | | |
|---|---|---|
| Hexamethyldisiloxane, 98% | Cat. No. AB111176 | ABCR, Karlsruhe |
| Decamethylcyclopentasiloxane, 97% | Cat. No. AB111012 | ABCR, Karlsruhe |
| Phenylmethylcyclosiloxane, 95% | Cat. No. AB153228 | ABCR, Karlsruhe |
| Allyl glycidyl ether (AGE) | Cat. No. A32608 | Sigma-Aldrich Chemie GmbH, Munich |
| Bis(aminopropyl)tetramethyldisiloxane, 97% | Cat. No. AB110832 | ABCR, Karlsruhe |
| N-Ethylmethallylamine (NEMALA), 98% | Cat. No. 291439 | Sigma-Aldrich Chemie GmbH, Munich |
| Trifluoromethanesulphonic acid, >99% | Cat. No. 347817 | Sigma-Aldrich Chemie GmbH, Munich |
| 1,1,3,3-Tetramethylguanidine (TMG), 99% | Cat. No. 241768 | Sigma-Aldrich Chemie GmbH, Munich |
| Tetramethylammonium hydroxide*5$H_2$O, >97% | Cat. No. T7505 | Sigma-Aldrich Chemie GmbH, Munich |
| Butyl titanate | TYZOR ® TBT | Dorf Ketal B. V., Eindhoven, Netherlands |

-continued

| | | |
|---|---|---|
| Dioctyltin diketonate | TIB KAT ® 223 | TIB Chemicals, Mannheim |
| Karstedt catalyst preparation, 1% Pt⁰ in decamethylcyclopentasiloxane | | Evonik Industries AG, Essen |
| Lewatit ® K 2621 | | LANXESS Deutschland GmbH, Leverkusen |
| Dynasylan ® 1505 | | Evonik Industries AG |
| N,N-Dicyclohexylcarbodiimide (DCC), 99% | Cat. No. D80002 | Sigma-Aldrich Chemie GmbH, Munich |
| Dynasylan ® 9165, Phenyltrimethoxysilane, PTMS, >98% | | Evonik Industries AG |
| Dynasylan ® MTMS, Methyltriethoxysilane, >98% | | Evonik Industries AG |
| Dynasylan ® 9265 Phenyltriethoxysilane, PTEOS, >97% | | Evonik Industries AG |
| Dynasylan ® A, Tetraethoxysilane | | Evonik Industries AG |
| Dynasylan PTEO, Propyltriethoxysilane | | Evonik |
| Phenyltrichlorosilane, PTS | | Wacker Dow Corning |
| Methyltrichlorosilane, MTS | | Wacker Dow Corning |
| Decamethylcyclopentasiloxane (D5) Dow Corning 245 Fluid | | Dow Corning |

Spectroscopic Analyses:

The recording and interpretation of NMR spectra is known to the skilled person. References include the book "NMR Spectra of Polymers and Polymer Additives", A. Brandolini and D. Hills, 2000, Marcel Dekker, Inc. The spectra were recorded at room temperature with a Bruker Spectrospin spectrometer, with measurement frequencies when recording the proton spectra of 399.9 MHz, when recording the $^{13}$C spectra of 100.6 MHz and when recording the $^{29}$Si spectra of 79.5 MHz. Owing to the basicity of the guanidinosiloxanes prepared, the use of chlorinated deuteriated solvents was avoided, and instead acetone-$d_6$ or methanol-$d_4$ (Sigma-Aldrich) was used.

The guanidines were identified by monitoring the formation of product in the $^{13}$C NMR. Thus, for example, the signal of the carbodiimide carbon (RN=C=NR) is found at .delta.=140 ppm and the signal of the guanidine group, depending on the guanidine substitution pattern HRN—C(=NR)—NRH, is found at .delta.=150-160 ppm. Reference may be made again at this point to the publication by Xuehua Zhu, Zhu Du, Fan Xu and Qi Shen (J. Org. Chem. 2009, 74, 6347-6349) and to the textbooks by Frederick Kurzer, K. Douragh-Zader—"Advances in the Chemistry of Carbodiimides" (Chemical Reviews, Vol. 67, No. 2, 1967, p. 99 ff.) and Henri Ulrich—"Chemistry and Technology of Carbodiimides" (John Wiley & Sons Ltd., ISBN 978-O-470-06510-5, 2007).

Determination of Total Nitrogen Content:

Basic nitrogen was determined by potentiometric titration with perchloric acid in a non-aqueous medium.

Determination of Relative Molar Mass of a Polymer Sample by Gel Permeation Chromatography (GPC):

The gel permeation chromatography analyses (GPC) took place with a Hewlett-Packard 1100 instrument, using an SDV column combination (1000/10 000 Å, each 65 cm, internal diameter 0.8 cm, temperature 30° C.), THF as mobile phase with a flow rate of 1 ml/min and with an RI detector (Hewlett-Packard). The system was calibrated against a polystyrene standard in the 162-2 520 000 g/mol range.

Drying Time Measurements:

A suitable means of assessing the catalytic activity of catalysts in a binder is to determine the drying time using a Drying Recorder. A test method of this kind is described by ASTM D5895. In analogy to this test method, drying time measurements were conducted using a BK3 Drying Recorder (The Mickle Laboratory Engineering Co. Ltd., Goose Green, Gomshall, Guildford, Surrey GU5 9LJ, UK). In this procedure, binder films were applied to standard glass strips (30×2.5 cm×2 mm) using a four-way bar coater (Erichsen Model 360, wet film thickness 80 μm). Beforehand, the standard glass strips were freed from adhering dust, dirt and grease with acetone and subsequently with an ethanol/DI water mixture. Using a lever on the reverse, the slide was then shifted leftwards into the start position. The scoring scribes were then folded down onto the sample glass plates. The tests were conducted at 23° C. and a RM of 30%. The test duration was set to 6, 12 or 24 hours, and measurement was commenced. After the end of the test duration, the scoring scribes were folded up and the glass plates were removed from assessment. The instants of initial drying and volume drying were read off using the associated timescale.

Inert Method:

Under "inert" conditions is meant that the gas space within the apparatus is filled with an inert gas, e.g. nitrogen or argon. This is achieved by the flooding of the apparatus, with a gentle inert gas stream ensuring inert conditions.

Example 1: Synthesis Examples

S1 (E6): Preparation of an aminopropylmethyldimethoxysilane Condensate

A 250 ml four-necked flask equipped with KPG stirrer, reflux condenser, nitrogen inlet, temperature sensor and heating hood was charged under inert conditions with 100 g (520 mmol) of aminopropylmethyldiethoxysilane (Dynasilan® 1505) and this initial charge was heated to 80° C. Then 18.8 g (1.04 mol) of DI water were added in portions and the mixture was maintained at 75-85° C. for two hours. After the end of hydrolysis, the mixture was concentrated on a rotary evaporator at 80° C. and 10-25 mbar. This gave a clear product, with a viscosity much higher than that of the reactant, of the general formula HO—[Si$^{(CH2)3NH2}$Me]$_n$—OH with n=11-16.

S2 (E1): Preparation of a Linear Aminosiloxane by Equilibration of a Condensate Prepared According to S1 with HMDS A 250 ml four-necked flask equipped with KPG stirrer, reflux condenser, nitrogen inlet, temperature sensor and heating hood was charged under inert conditions with 75.1 g of a condensate according to S1 having a nitrogen value of $N_{tot.}$=11.5 wt % and a viscosity of 807 mPas (Brookfield), and 74.9 g of hexamethyldisiloxane were added. With stirring of the reaction mixture, 80 mg (=0.05 wt %) of tetramethylammonium hydroxide were then added, and the mixture was heated to 90° C. After an hour, the two-phase reaction mixture, which was turbid and colourless, became homogeneous and clear, but becomes slightly turbid again over the total reaction time of 6.5 hours. After the end of the reaction time, the catalyst was destroyed on a rotary evaporator at 150° C. and 1 mbar for three hours. The fraction of volatile constituents found in this case was 31.8 wt %. $^{29}$Si NMR analysis of the end product confirmed the structure of M—[D$^{(CH2)3NH2}$]$_{3.3}$—M, and a nitrogen value of $N_{tot}$=8.5 wt % was found.

S3 (H1): Hydrosilylation of Allyl Glycidyl Ether (AGE) Over a Pendant Hydrogensiloxane A 1000 ml multi-necked flask equipped with KPG stirrer, reflux condenser, nitrogen inlet, temperature sensor, dropping funnel and heating hood was charged under inert conditions with 95.4 g (0.84 mol) of allyl glycidyl ether (AGE), and this initial charge was heated to 70° C. Subsequently, in a counter-current stream of nitrogen, 198 mg of a Karstedt catalyst preparation (corresponding to 5 ppm of Pt$^0$) were added. Then, over the course of 30 minutes, 300 g of a pendant hydrogensiloxane (2.23 mol SiH/kg) were added from a dropping funnel. The dropping rate was regulated so as to achieve an exothermic temperature of not more than 90° C. After three hours, the SiH conversion was found to be 82% by gas volumetry. In order to complete the reaction, a further 20 g (0.18 mol) of allyl glycidyl ether and 99 mg of the Karstedt catalyst preparation (corresponding to 2.5 ppm of Pt$^0$) were added, and the reaction was carried out to an SiH conversion >99% at 70° C. over a further seven hours. The product obtained was distilled on a rotary evaporator at 130° C. and a pressure <1 mbar for a number of hours. This gave the epoxy-functional siloxane as a clear, pale yellowish liquid. Investigation by means of $^{29}$Si NMR confirmed the target structure.

S4 (N1): Ring Opening of Epoxide S3 with Ammonia

The resulting product S3 was subjected in analogy to WO 2011095261 (US 2012/282210) to an epoxidic ring opening by means of ammonia. This was done by taking up 50 g of the epoxysiloxane into 100 g of isopropanol and transferring the mixture to an autoclave tube. Using a mixture of ethanol and dry ice, the outer wall of the autoclave tube was cooled down such that 10.9 g of ammonia were condensed in by simple introduction using a glass frit over 30 minutes. The tube was sealed and was heated at 100° C. for four hours. The isopropanol and excess ammonia were then distilled off on a rotary evaporator within an hour at 60° C. and <1 mbar. Wet-chemical determination of the primary nitrogen value was 2.8 wt %, in agreement with the theoretical value.

S5 (G1): Preparation of a Guanidine by Reaction of Synthesis Product S4

A 250 ml four-necked flask equipped with KPG stirrer, distillation bridge with vacuum attachment, nitrogen blanket, temperature sensor and heating hood was charged under inert conditions with 71.1 g (147.34 mmol/—NH$_2$) of the amino-functional siloxane from the preliminary stage, and 28.9 g (139.92 mmol) of N,N-dicyclohexylcarbodiimide, and this initial charge was reacted at 90° C. for 10 hours. After the end of the reaction time, all of the volatile constituents were distilled off within an hour at 90° C. and 20 mbar under a diaphragm pump vacuum. Investigation by $^{29}$Si and $^{13}$C NMR confirmed the target structure of the clear, pale yellowish product.

S6 (H2): Hydrosilylation of Allyl Glycidyl Ether (AGE) Over a Cyclic Hydrogensiloxane A 1000 ml multi-necked flask equipped with KPG stirrer, reflux condenser, nitrogen inlet, temperature sensor, dropping funnel and heating hood was charged under inert conditions with 93.3 g (0.82 mol) of allyl glycidyl ether (AGE), and this initial charge was heated to 70° C. Subsequently, in a counter-current stream of nitrogen, 197 mg of a Karstedt catalyst preparation (corresponding to 5 ppm of Pt$^0$) were added. Then, over the course of 30 minutes, 300 g of a cyclic hydrogensiloxane (2.18 mol SiH/kg) were added from a dropping funnel. The dropping rate was regulated so as to achieve an exothermic temperature of not more than 90° C. After three hours, the SiH conversion was found to be 74% by gas volumetry. In order to complete the reaction, a further 19 g (0.17 mol) of allyl glycidyl ether (AGE) and 197 mg of the Karstedt catalyst preparation (corresponding to 5 ppm of Pt$^0$) were added, and the reaction was carried out to an SiH conversion >99% at 70° C. over a further seven hours. The product obtained was distilled on a rotary evaporator at 100° C. and a pressure 15 mbar for a number of hours. This gave the epoxy-functional siloxane as a clear, pale yellowish liquid. Investigation by means of $^{29}$Si NMR confirmed the target structure, with a theoretical epoxy value of 2.79%.

S7 (N2): Ring Opening of Epoxide S6 with Ammonia

The resulting product (S6) was further subjected in analogy to WO 2011095261 (US 2012/282210) to an epoxidic ring opening by means of ammonia. For this purpose, 250 g of the epoxysiloxane (theoretical epoxy value 2.79%) were taken up in 500 g of isopropanol, and transferred to an autoclave tube. Using a mixture of ethanol and dry ice, the outer wall of the autoclave tube was cooled down such that 60 g of ammonia (710% excess) were condensed in by simple introduction using a glass frit over 30 minutes. The tube was closed and heated to 100° C. for four hours, during which a pressure increase up to 22 bar was recorded. After the end of the reaction time, the mixture was cooled to room temperature and the pressure vessel was let down. The isopropanol and excess ammonia were then distilled off on a rotary evaporator within an hour at 60° C. and <1 mbar. Wet-chemical determination of the primary nitrogen value was 2.8 wt %, in agreement with the theoretical value.

S8 (G2): Preparation of a Cyclic Siloxane Having Guanidine Groups

A 250 ml four-necked flask equipped with KPG stirrer, distillation bridge with vacuum attachment, nitrogen blanket, temperature sensor and heating hood was charged under inert conditions with 75.7 g (156.84 mmol/—NH$_2$) of the amino-functional siloxane from the preliminary stage, and 24.3 g (117.67 mmol) of N,N-dicyclohexylcarbodiimide, and this initial charge was reacted at 90° C. for 10 hours. After the end of the reaction time, all of the volatile constituents were distilled off within an hour at 90° C. and 20 mbar under a diaphragm pump vacuum. Investigation by $^{29}$Si and $^{13}$C NMR confirmed the target structure of the clear, pale orange-coloured product.

S9 (E3): Equilibration of the Condensate S1 to Form a Cyclic Aminopropylsiloxane A 1000 ml multi-necked flask equipped with KPG stirrer, reflux condenser, nitrogen inlet, temperature sensor, dropping funnel and heating hood was charged under inert conditions with 61.2 g (522 mmol/—NH$_2$) of a condensate prepared according to S1, and with 38.8 g (523 mmol/D) of octanomethylcyclotetrasiloxane, 400 g of xylene and 2.5 g of tetrametylammonium hydroxide*pentahydrate (TMAH*5H$_2$O) were added. The reaction mixture was heated at 90° C. for 6 hours and then heated at reflux for eight hours to destroy the catalyst. The continuous reduction in amine level during this procedure was measured using a pH paper in a stream of nitrogen. When destruction of the catalyst was at an end, the solvent was removed on a rotary evaporator and intensive distillation took place on the rotary evaporator at 100° C. and <1 mbar for one hour. The slightly turbid product, finally, was filtered through a fluted filter, giving a clear and colourless product.

S10 (G3): Preparation of a Cyclic Guanidine by Reaction of a Cyclic Aminosiloxane with DCC A 250 ml multi-necked flask equipped with KPG stirrer, reflux condenser, nitrogen inlet, temperature sensor and heating hood was charged under inert conditions with 80 g of the cyclic aminopropylsiloxane S9 and admixed with 82.6 g (400 mmol) of N,N-dicyclohexylcarbodiimide (DCC). The mixture was reacted at 90° C. for six hours, after which volatile constituents were removed by distillation under 15 mbar for an hour. The product was obtained as a clear, slightly yellowish product, which was solid at room temperature. Analysis by means of $^{13}$C NMR spectroscopy showed the complete conversion of the carbodiimide.

S11 (E4): Equilibration of the Condensate S1 to Form a Cyclic Aminopropylphenylmethylsiloxane A 250 ml multi-necked flask equipped with KPG stirrer, reflux condenser, nitrogen inlet, temperature sensor, dropping funnel and heating hood was charged under inert conditions with 11.6 g (99 mmol/—NH$^2$) of a condensate prepared according to S1, and with 13.5 g (99 mmol/D$^{PhiMe}$) of phenylmethylcyclotetrasiloxane, (CAS 546-45-2), 100 g of xylene and 0.6 g of tetrametylammonium hydroxide*pentahydrate (TMAH*5H$_2$O) were added. The reaction mixture was heated at 90° C. for 6 hours and then heated at reflux for eight hours to destroy the catalyst. The continuous reduction in amine level during this procedure was measured using a pH paper in a stream of nitrogen. When destruction of the catalyst was at an end, the solvent was removed on a rotary evaporator and intensive distillation took place on the rotary evaporator at 100° C. and <1 mbar for one hour. The slightly turbid product, finally, was filtered through a fluted filter, giving a clear and colourless product.

S12 (G4): Preparation of a Cyclic Siloxane Containing Guanidine Groups by Reaction of a Cyclic Aminopropylphenylmethylsiloxane with DCC A 100 ml multi-necked flask equipped with KPG stirrer, reflux condenser, nitrogen inlet, temperature sensor and heating hood was charged under inert conditions with 21.4 g (84.5 mmol/—NH$_2$) of the cyclic aminopropylphenylmethylsiloxane (S11) and admixed with 16.6 g (80.5 mmol) of N,N-dicyclohexylcarbodiimide (DCC). The mixture was reacted at 90° C. for six hours, after which volatile constituents were removed by distillation under 15 mbar for an hour. The product was obtained as a clear, slightly yellowish product, which was solid at room temperature. Analysis by means of $^{13}$C NMR spectroscopy showed the complete conversion of the carbodiimide.

S13 (G5): Synthesis of a Cyclotetrasiloxane Containing Guanidino Groups by Reaction of Tetra(Chloropropyl)Tetramethylcyclosiloxane with Tetramethylguanidine A 500 ml multi-necked flask equipped with KPG stirrer, reflux condenser, nitrogen inlet, temperature sensor and heating hood was charged under inert conditions with 50 g (0.37 mol) of tetra(chloropropyl)tetramethylcyclosiloxane $D_4^{(CH2)3Cl}$, which was obtained by preceding aqueous hydrolysis/condensation of a chloropropyldichloromethylsilane, and this initial charge was heated to 60° C., and a quantity of 126.4 g (1.1 mol) of tetramethylguanidine was added over 30 minutes. The reaction temperature was raised to 130° C. and maintained for six hours, during which substantial salt formation was observed as the reaction time moved forward. After the end of the reaction time, the batch was cooled to room temperature and diluted with 100 ml of toluene. The product was then freed from the salt using a filter press (Seitz K300) and then freed from the unreacted tetramethylguanidine on a rotary evaporator at 100° C. and a pressure <1 mbar for an hour. Following distillation, the tetraguanidinopropylcyclotetrasiloxane was obtained as a turbid, slightly yellowish product. Analysis by $^1$H and $^{29}$Si NMR confirmed the structure.

S14 (G6): Synthesis of a Cyclic Guanidinosiloxane by Reaction of 2,4,6,8-Tetrakis(3-Chloropropyl)-2,4,6,8-Tetramethylcyclotetrasiloxane [$D_4^{(C3H6Cl)}$] with TMG A 500 ml multi-necked flask equipped with KPG stirrer, dropping funnel, internal temperature measurement sensor and inert gas feed line was copiously inertized with nitrogen and then charged with 100 g (183 mmol=732 mmol/—C$_3$H$_6$Cl) of 2,4,6,8-tetrakis(3-chloropropyl)-2,4,6,8-tetramethylcyclotetrasiloxane [CAS 96322-87-1], which was heated to 60° C. Then 252.8 g (2.2 mol) of tetramethylguanidine were metered in, and the mixture was heated at 130° C. for six hours. After the onset of copious precipitation of salt, 200 ml of toluene were added in order to keep the batch stirrable. After the end of the reaction, the salt was separated using a filter press over a Seitz K300 filter. Unreacted tetramethylguanidine was subsequently removed from the filtrate by distillation under an intensive oil pump vacuum (<1 mbar) at 100° C. for an hour. The viscous, slightly yellowish and turbid product obtained was discharged under inert gas.

S15 (E5): Equilibration of Phenylmethylcyclosiloxane and 2,4,6,8-Tetrakis(3-Chloropropyl)-2,4,6,8-Tetramethylcyclotetrasiloxane A 250 ml multi-necked flask equipped with KPG stirrer, dropping funnel, internal temperature measurement sensor and inert gas feed line was copiously inertized with nitrogen and then charged with 20 g (147 mmol) of phenylmethylcyclosiloxane (CAS 546-45-2). Then 20 g (36.6 mmol=147 mmol/—C$_3$H$_6$Cl) tetrakis(3-chloropropyl)-2,4,6,8-tetramethylcyclotetrasiloxane, 160 g of toluene and 12 g of Lewatit® K2621 were added. Equilibration was then carried out at 60° C. for six hours, and the Lewatit® catalyst was separated off on a fluted filter. The filtrate was freed from toluene on a rotary evaporator, and then distilled fully at 70° C. and <1 mbar for an hour. The clear, colourless product thus obtained was discharged under inert gas.

S16 (G7): Synthesis of a Cyclic Guanidinosiloxane by Reaction of S15 with Tetramethylguanidine A 500 ml multi-necked flask equipped with KPG stirrer, dropping funnel, internal temperature measurement sensor and inert gas feed line was inertized copiously with nitrogen and then charged with 30 g (55 mmol=110 mmol/—C$_3$H$_6$Cl) of S15 equilibrate, and 38 g (330 mmol) of tetramethylguanidine and 40 g of xylene were added. The reaction mixture was heated and held at a reaction temperature of 130° C. for six hours. After the end of reaction, a Seitz K300 filter in a filter press was used to separate off the precipitated tetramethyl hydrochloride. Unreacted tetramethylguanidine and the solvent were subsequently removed from the filtrate by distillation under an intense oil pump vacuum (<1 mbar)

at 100° C. for an hour. The highly viscous, slightly yellowish and clear product obtained was discharged under inert gas.

S17 (G8): Synthesis of 2',2'-((1,1,3,3-Tetramethyldisiloxane-1,3-Diyl)Bis(Propane-3,1-Diyl))Bis(1,3-Dicyclohexylguanidine)

A 250 ml four-necked flask equipped with KPG stirrer, reflux condenser, nitrogen blanketing, temperature sensor and heating hood was charged under inert conditions with 24.85 g (100 mmol) of 1,3-bis(3-aminopropyl)tetramethyldisiloxane, and 40.44 g (196 mmol) of N,N-dicyclohexylcarbodiimide were added. With continuing stirring, the reaction mixture was reacted at 90° C. for six hours, after which all of the volatile constituents were distilled off over 30 minutes under a diaphragm pump vacuum. This gave a clear, viscous product, which after analysis by means of $^{13}C$ NMR showed complete conversion of the carbodiimide.

S18 (G9): Reaction of the Condensate 51 with DCC

A 500 ml four-necked flask equipped with KPG stirrer, reflux condenser, nitrogen blanketing, temperature sensor and heating hood was charged under inert conditions with 128.09 g of a condensate according to S1 (N value=11.3 wt %, 122.5 g/eq —$NH_2$, =1.05 mol $NH_2$), and 71.91 g (348.52 mmol) of N,N-dicyclohexylcarbodiimide were added. With continuing stirring, the reaction mixture was reacted at 90° C. for six hours, after which all of the volatile constituents were distilled off over 30 minutes under a diaphragm pump vacuum. This gave a clear, viscous product (S18) which after analysis by means of $^{13}C$ NMR showed complete conversion of the carbodiimide.

S19 (G10): Reaction of the Condensate S1 with DCC

A 500 ml four-necked flask equipped with KPG stirrer, reflux condenser, nitrogen blanketing, temperature sensor and heating hood was charged under inert conditions with 94.2 g of a condensate according to S1 (N value=11.3 wt %, 122.5 g/eq —$NH_2$, =769.1 mmol) and 105.8 g (512.72 mmol) of N,N-dicyclohexylcarbodiimide were added. With continuing stirring, the reaction mixture was reacted at 90° C. for six hours, after which all of the volatile constituents were distilled off over 30 minutes under a diaphragm pump vacuum. This gave a clear product, highly viscous in the hot state, which after analysis by means of $^{13}C$ NMR showed complete conversion of the carbodiimide. After cooling to RT, the product solidified to form a clear mass, which was reversibly meltable, however.

S20 (E7): Preparation of a Linear Siloxane of the Formula $MD_3D^{C3H6Cl}M$

A 250 ml single-necked flask was charged with 39.3 g (288 mmol/$D^{C3H6Cl}$) of a cyclic chloropropyldichloromethylsilane hydrolysis condensate of the general formula $[D^{C3H6Cl}]_4$ 64 g (863 mmol/D) of decamethylcyclopentasiloxane and 46.7 g (288 mmol/MM) of hexamethyldisiloxane. With magnetic stirring, 0.15 g of trifluoromethanesulphonic acid was added and the batch was stirred overnight. The next day, the equilibration was completed on a rotary evaporator at 90° C. for four hours, after which the acid was deactivated by addition of 8 g of sodium hydrogencarbonate. Filtration on a fluted filter gave 158 g of a clear, colourless liquid. Analysis by $^{29}Si$ spectroscopy confirmed the structure $[MD_3D^{C3H6Cl}M]$.

S21 (G11): Preparation of a Linear Siloxane Containing Guanidinopropyl Groups:

A 250 ml four-necked flask equipped with KPG stirrer, reflux condenser, nitrogen inlet, temperature sensor and heating hood was charged under inert conditions with 80 g (153 mmol/$D^{C3H6Cl}$) of S20, and this initial charge was heated to 100° C. Then 53 g (460 mmol) of tetramethylguanidine were metered in via a dropping funnel over an hour, and the mixture was held at 130° C. for a further eight hours. After the end of reaction, the precipitated tetramethylguanidine hydrochloride was filtered off and the product was distilled under an oil pump vacuum at 6 mbar and 130° C. for an hour. A further filtration gave 55 g of a clear product. $^{29}Si$ and $^{13}C$ NMR analyses confirmed the structure.

S22 (E8): Preparation of a Linear Siloxane of the Formula $MD_3D^{C3H6NH2}M$

A 250 ml multi-necked flask equipped with KPG stirrer, reflux condenser, nitrogen inlet, temperature sensor, dropping funnel and heating hood was charged under inert conditions with 35 g (300 mmol/—$NH_2$) of a condensate according to S1 with a nitrogen value of $N_{tot.}$=11.5 wt % and a viscosity of 807 mPas (Brookfield), and 66.6 g (900 mmol/D) of octomethylcyclotetrasiloxane, 48.5 g (300 mmol/MM) and 60 mg of tetrametylammonium hydroxide pentahydrate (TMAH*$5H_2O$) were added. The reaction mixture was heated at 90° C. for 6 hours and then heated on a rotary evaporator at 130° C. for three hours in order to destroy the catalyst. When destruction of the catalyst was at an end, the solvent was removed on a rotary evaporator and residue was subjected to intensive distillation on the rotary evaporator at 100° C. and <1 mbar for an hour. Lastly, the slightly turbid product was filtered through a fluted filter, to give a clear, colourless product which according to $^{29}Si$ NMR had an approximate structure of $M(DD^{C3H6NH2})_{7.4}M$.

S23 (G12): Preparation of a Linear Siloxane, Carrying Guanidine Groups, of the Formula $MD_3D^{C3H6-GUA}M$ A 100 ml four-necked flask equipped with KPG stirrer, reflux condenser, nitrogen inlet, temperature sensor and heating hood was charged under inert conditions with 50 g (135 mmol/—$NH_2$) of the linear aminosiloxane prepared above (S22) ($N_{theor.}$=3.787%) and this initial charge was admixed with 26.5 g (128 mmol) of N,N-dicyclohexylcarbodiimide. The resulting reaction mixture was reacted at 90° C. for six hours, giving a colourless, slightly turbid product. Analysis by $^{13}C$ NMR spectroscopy showed complete conversion of the carbodiimide. Subsequently, $^{29}Si$ NMR spectroscopy found a siloxane chain length of N=5.6, indicating a structure of $M(DD^{C3H6GUA})_{3.6}M$.

S24 (E9): Preparation of a Linear Aminopropylsiloxane by Equilibration of S1 with HMDS A 250 ml four-necked flask equipped with KPG stirrer, reflux condenser, nitrogen inlet, temperature sensor and heating hood was charged under inert conditions with 90 g of a condensate according to S1 with a nitrogen value of $N_{tot.}$=11.5 wt % and a viscosity of 807 mPas (Brookfield), and 60 g of hexamethyldisiloxane were added. Then, with the reaction mixture being stirred, 80 mg (=0.05 wt %) of tetramethylammonium hydroxide were added, and the mixture was heated to 90° C. After a reaction time of one hour, the two-phase, turbid and colourless reaction mixture became homogeneous and clear. After the end of the reaction time, the catalyst was destroyed on a rotary evaporator at 150° C. and 1 mbar for three hours. A volatile constituents fraction of 20 wt % was ascertained here. The $^{29}Si$ NMR analysis of the end product confirmed the structure of $M-[D^{(CH2)3NH2}]_{3.5}$—M, and a nitrogen value of $N_{tot.}$=8.7 wt % was found.

S25 (G14): Preparation of a Linear Siloxane Containing Guanidinopropyl Groups

A 250 ml four-necked flask equipped with KPG stirrer, reflux condenser, nitrogen inlet, temperature sensor and heating hood was charged under inert conditions with 104.1 g (646 mmol/—$NH_2$) of the above S24-prepared linear aminosiloxane ($N_{theor.}$=8.7%), and 126.8 g (614 mmol) of N,N-dicyclohexylcarbodiimide were added. The resulting reaction mixture was reacted at 90° C. for six hours, giving a slightly yellowish product, colourless in the hot state, which became solid on cooling, but was reversibly meltable. Analysis by $^{13}C$ NMR spectroscopy showed complete conversion of the carbodiimide. Moreover, $^{29}Si$ NMR spectroscopy found a siloxane chain length of N=5.5, suggesting a structure of $M(D^{C3H6GUA})_{3.5}M$ S26 (G14): Preparation of a Linear Siloxane Containing Guanidinopropyl and Aminopropyl Groups A 100 ml four-necked flask equipped with KPG stirrer, reflux condenser, nitrogen inlet, temperature sensor and heating hood was charged under inert conditions with 49.2 g (299 mmol/—NH$_2$) of a linear aminosiloxane in analogy to S24 with a nitrogen value of $N_{theor.}$=8.5 wt %, and 30.8 g (149 mmol) of N,N-dicyclohexylcarbodiimide were added. The reaction mixture thus obtained was reacted at 90° C. for six hours, giving a colourless, clear product. Analysis by $^{13}C$ NMR spectroscopy showed complete conversion of the carbodiimide. Moreover, $^{29}Si$ NMR spectroscopy found a siloxane chain length of N=5.6, suggesting a structure of $M(D^{C3H6NH2})_{~1.8}(D^{C3H6-GUA})_{~1.8}M$.

S27 (G15): Preparation of a Siloxane Containing Linear Guanidinopropyl Groups

A 100 ml four-necked flask equipped with KPG stirrer, reflux condenser, nitrogen inlet, temperature sensor and heating hood was charged under inert conditions with 37.7 g (215 mmol/—NH$_2$) of a linear aminosiloxane prepared above in analogy to S24 (N=8.7 wt %), and 42.2 g (204 mmol) of N,N-dicyclohexylcarbodiimide were added. The reaction mixture thus obtained was reacted at 90° C. for eight hours, giving a slightly yellowish, clear and viscous product. Analysis by $^{13}C$ NMR spectroscopy showed complete conversion of the carbodiimide. Moreover, $^{29}Si$ NMR spectroscopy found a siloxane chain length of N=4.7, suggesting a structure of $M(DD^{C3H6GUA})_{2.7}M$.

S28: Preparation of a Linear, Hydroxyl-Terminated Siloxane Condensate Containing Guanidine Groups A 250 ml four-necked flask equipped with KPG stirrer, reflux condenser, nitrogen blanketing, temperature sensor and heating hood was charged under inert conditions with 102.1 g (232.24 mmol —NH$_2$) of a linear siloxane condensate which has propyl and aminopropyl groups and is hydroxyl-terminated ($N_{prim.}$=3.64 wt %, $M_w$=~730 g/mol), and 47.9 g (232.24 mmol) of N,N-dicyclohexylcarbodiimide were added. With stirring continuing, the reaction mixture was reacted at 90° C. for six hours, after which all of the volatile constituents were removed by distillation within 30 minutes under a diaphragm pump vacuum. This gave a clear, viscous product, which according to analysis by $^{13}C$ NMR showed complete conversion of the carbodiimide.

S29 (H3): Hydrosilylation of N-Ethylmethylallylamine (NEMALA) Over a Cyclic Hydrogensiloxane A 2000 ml multi-necked flask equipped with KPG stirrer, reflux condenser, nitrogen inlet, temperature sensor, dropping funnel and heating hood was charged under inert conditions with 756.3 g of a cyclic hydrogensiloxane (0.1332 wt %, corresponding to 756.3 g/eq SiH), 4.43 g of sodium carbonate were added, and the mixture was heated to a reaction temperature of 130° C. Shortly before the reaction temperature was reached, 48 mg of di-μ-chlorodichlorobis(cyclohexene)diplatinum(II) catalyst were added, and then in portions 885.3 g of N-ethylmethylallylamine (NEMALA, CAS 18328-90-0) were added via a dropping funnel in such a way that the reaction temperature did not exceed 145° C. The reaction was taken over seven hours at 130° C. to an SiH conversion >99%, with the reaction monitored hourly by means of a determination by gas volumetry. The resulting reaction mixture was cooled to room temperature and filtered overnight, giving 881.5 g (theoretical 885.25 g). The subsequent multi-hour distillation under an oil pump vacuum at 130° C. and <1 mbar afforded 403.5 g (theoretical 406.24 g) of product, and 474 g (theoretical 478.96 g) of volatile compounds were condensed out under cooling with liquid nitrogen. The amino-functional cyclic siloxane was obtained as a clear, slightly yellowish liquid. Analysis by $^1H$, $^{13}C$ and $^{29}Si$ NMR confirmed the target structure.

S30 (G16): Preparation of a Guanidine by Reaction of the Synthesis Product S29

A 500 ml four-necked flask equipped with KPG stirrer, distillation bridge with vacuum attachment, nitrogen blanketing, temperature sensor and heating hood was charged under inert conditions with 203.1 g (500 mmol/—NH—) of the amino-functional siloxane from the preceding stage, S29, and with 59.9 g (475 mmol) of N,N,-diisopropylcarbodiimide, and this mixture was reacted at 90° C. for 10 hours. After the end of the reaction time, all of the volatile constituents were distilled off over a further hour at 100° C. and 20 mbar under a diaphragm pump vacuum. Analysis by $^{29}Si$ and $^{13}C$ NMR confirmed the target structure of the clear, slightly yellowish product.

S31: Preparation of a Reaction Product of Dynasylan® AMEO and DCC

A 500 ml four-necked flask equipped with KPG stirrer, distillation bridge with vacuum attachment, nitrogen blanketing, temperature sensor and heating hood was charged under inert conditions with 221.4 g (1 mol) of an amino-functional silane (Dynasylan® AMEO, Evonik Degussa GmbH) and 200.1 g (970 mmol) of N,N-dicyclohexylcarbodiimide, and this initial charge was reacted at 90° C. for 10 hours. After the end of the reaction time, all of the volatile constituents were distilled off over 30 minutes at 90° C. and 20 mbar under a diaphragm pump vacuum. The colourlessly clear to yellowish product was then stored in the absence of moisture. Spectroscopic analysis by means of $^{13}C$ NMR revealed the quantitative conversion of the carbodiimide, with the further analysis of the reaction mixture being in line with expectations.

Synthesis of Resins 1 to 10

Resin 1

In a method based on EP 0157318, a methoxy-functional methyl-silicone resin was prepared by hydrolysis and subsequent condensation of 559.7 g (3.74 mol) of trichloromethylsilane with a methanol/water mixture [373.1 g (11.64 mol) MeOH/67.2 g H$_2$O (3.71 mol)]. After the end of addition of the methanol/water mixture, the reaction mixture was distilled at 16 mbar. Analysis by $^1H$ NMR gave a methoxy functionality of 35 wt %; the molar masses were found to be $M_w$=746 g/mol, $M_n$=531 g/mol, $M_w/M_n$=1.4.

Resin 2

An ethoxy-functional methyl-silicone resin was prepared by condensation of trimethoxymethylsilane with an ethanol/water mixture. For this purpose, 600 g (0.94 mol) of trimethoxymethylsilane were introduced with 30 g of ethanol, and then a water/HCl mixture was added dropwise at 60° C. [67.7 g H$_2$O (3.76 mol) admixed with 0.03 g HCl (37.5% strength), 20 ppm] dropwise. After the reaction mixture had been held under reflux for an hour, it was distilled at 90° C. and then held under vacuum for 30 minutes more. Analysis by $^1$H NMR gave an ethoxy functionality of 42 wt %; the molar masses were found to be $M_w$=784 g/mol, $M_n$=581 g/mol, $M_w/M_n$=1.4.

Resin 3

In a method based on EP 1142929, a methoxy-functional methyl-phenyl-silicone resin was prepared. For this purpose, 606.3 g (2.86 mol) of phenyltrichlorosilane were introduced, and a methanol/water mixture [59.4 g (1.80 mol) methanol and 18.07 g (1.00 mol) water] was added dropwise. Then 70.6 g (0.19 mol) of decamethylcyclopentasiloxane (D5) and 24.3 g (0.15 mol) of hexametyldisiloxane are added to the reaction mixture, and at a temperature of <50° C. again a methanol/water mixture [69.9 g (2.12 mol) methanol and 50.8 g (2.82 mol) water] is added dropwise. Following the first vacuum distillation at about 50° C. under a pressure <100 mbar, the reaction mixture is held under vacuum for a further hour. Following further addition of 16.9 g of methanol (0.52 mol), distillation took place again under a pressure <100 mbar at 120° C. Analysis by $^1$H NMR gave a methoxy functionality of 6 wt %; the molar masses were found to be $M_w$=4.440 g/mol, $M_n$=1.769 g/mol, $M_w/M_n$=2.5. Using 83.6 g of xylene, the viscosity was adjusted, and the solids of the resin as well were adjusted to 85 wt %.

Resin 4

In a method based on EP 1142929, a methoxy-functional methyl-phenyl-silicone resin was prepared. For this purpose, first of all, 562.5 g (2.66 mol) of phenyltrichlorosilane were slowly admixed with 167.4 g (5.21 mol) of methanol. Then 122.5 g (0.27 mol) of decamethylcyclopentasiloxane (D5) were added, and at 50° C. 48.0 g (2.60 mol) of water were added dropwise. This was followed by vacuum distillation under a pressure <100 mbar at 60° C. Following inertization with nitrogen and addition of a further 100.00 g (3.12 mol) of methanol, stirring was continued for 30 minutes more, and then a further vacuum distillation was carried out. Analysis by $^1$H NMR gave a methoxy functionality of 15 wt %; the molar masses were found to be $M_w$=1.656 g/mol, $M_n$=966 g/mol, $M_w/M_n$=1.7.

Resin 5

In a method based on EP 1142929, a methoxy-functional methyl-phenyl-silicone resin was prepared. For this purpose, 419.4 g (2.81 mol) of methyltrichlorosilane were slowly admixed with 129.4 g (4.03 mol) of methanol with stirring. Subsequently, 228.2 g (1.08 mol) of phenyltrichlorosilane were added dropwise, during which the reaction mixture rose in temperature to 35° C. Following the PTS addition, 249.9 g of a methanol/water mixture [186.4 g (5.82 mol) MeOH and 63.5 g (3.52 mol) H$_2$O] were added, followed by stirring finally for 2 hours and, after the end of the addition, by vacuum distillation at 16 mbar. Analysis by $^1$H NMR gave a methoxy functionality of 25 wt %; the molar masses were found to be $M_w$=3.050 g/mol, $M_n$=1.050 g/mol, $M_w/M_n$=2.7.

Resin 6

In a method based on EP 0 157 318 B1, a methoxy-functional methyl-phenyl-silicone resin was prepared. 858.5 g of resin 3 were introduced with 9.4 g (0.15 mol) of ethylene glycol, 14.3 g of xylene and 41.0 g (0.31 mol) of trimethylolpropane, 0.1 g of butyl titanate was added, and the mixture was heated to reflux. Distillation was then carried out, before the increase in viscosity, until a clear resin was obtained. After cooling to 120° C., first half of 40.8 g of isobutanol were added, and the remaining amount of isobutanol was added after further cooling to 105° C. Lastly, stirring took place at 60° C. for an hour. The solids of the binder were adjusted to 80 wt % using xylene. Analysis by $^1$H NMR gave a methoxy-functionality of 2 wt %; the molar masses were found to be $M_w$=40 000 to 90 000 g/mol, $M_n$=3260 to 3763 g/mol, $M_w/M_n$=12 to 24. The resulting resin was dissolved in xylene.

Resin 7

In a method based on EP 1142929, an ethoxy-functional methyl-phenyl-silicone resin was prepared. For this purpose, first of all, 571.0 g (2.70 mol) of phenyltrichlorosilane were slowly admixed with 247.7 g (5.38 mol) of ethanol. Then 79.9 g (0.22 mol) of decamethylcyclopentasiloxane (D5) were added, and at 50° C. 60.5 g (3.36 mol) of water were added dropwise. This was followed by vacuum distillation under a pressure <100 mbar at 60° C. Following inertization with nitrogen and addition of a further 40.8 g (0.88 mol) of ethanol, stirring was continued for 30 minutes more, and then a further vacuum distillation was carried out. Analysis by $^1$H NMR gave an ethoxy functionality of 14 wt %; the molar masses were found to be $M_w$=1790 g/mol, $M_n$=1160 g/mol, $M_w/M_n$=1.5.

Resin 8

In a method based on EP 1142929, an ethoxy-functional phenyl-silicone resin was prepared by the hydrolysis and subsequent condensation of 646.1 g (3.05 mol) of phenyltrichlorosilane with an ethanol/water mixture [296.3 g (6.43 mol) EtOH/57.5 g H$_2$O (3.19 mol)]. After the end of the addition of the ethanol/water mixture, the reaction mixture was distilled at 16 mbar. Analysis by $^1$H NMR gave an ethoxy functionality of 25 wt %; the molar masses were found to be $M_w$=940 g/mol, $M_n$=740 g/mol, $M_w/M_n$=1.3.

Resin 9

In a method based on EP 1142929, a methoxy-functional phenyl-silicone resin was prepared by the hydrolysis and subsequent condensation of 745.6 g (3.53 mol) of phenyltrichlorosilane with a methanol/water mixture [184.3 g (5.76 mol) MeOH/70.1 g H$_2$O (3.89 mol)]. After the end of the addition of the methanol/water mixture, the reaction mixture was distilled at 16 mbar. Analysis by $^1$H NMR gave a methoxy functionality of 17 wt %; the molar masses were found to be $M_w$=1400 g/mol, $M_n$=860 g/mol, $M_w/M_n$=1.6.

Resin 10

In a method based on EP 1142929, a methoxy-functional methyl-phenyl-silicone resin was prepared. For this purpose, first of all, 576.5 g (2.73 mol) of phenyltrichlorosilane were slowly admixed with 172.4 g (5.38 mol) of methanol. Then 101.1 g (0.27 mol) of decamethylcyclopentasiloxane (D5) were added, and at 50° C. 49.2 g (2.73 mol) of water were added dropwise. This was followed by vacuum distillation under a pressure <100 mbar at 60° C. Following inertization with nitrogen and addition of a further 100.8 g (3.1 mol) of methanol, stirring was continued for 30 minutes more, and then a further vacuum distillation was carried out. Analysis by $^1$H NMR gave a methoxy functionality of 17 wt %; the molar masses were found to be $M_w$=1220 g/mol, $M_n$=780 g/mol, $M_w/M_n$=1.6.

Example 2: Compositions/formulations quantity figures for the catalysts are based on the mass of the overall composition, and are expressed in wt %. Where a catalyst is added in dissolved form, the quantity figure is based on the amount of catalyst in the solution.

The binders (resins) may optionally comprise a crosslinker. The quantity figures for the crosslinker are expressed in wt % based on the overall composition.

Resin 3 was formulated using xylene as solvent. The concentration of resin 3 in xylene is 85 wt % based on the overall mass, and this corresponds to the solids content.

In the case of resin 6, the solids was adjusted to 80 wt % following the addition of xylene.

The various binders were introduced and mixed with the catalyst by stirring, using a spatula. The resultant compositions are listed in Table 1.

TABLE 1

Compositions (the percentage figures are wt % based on the overall mixture, catalyst solvents where appropriate are disregarded); apart from Z1.1, Z4.13 and Z9.13, all of the compositions are inventive.

| Composition | Catalyst | [%] | Resin 1 [%] | Crosslinker I [%] | Crosslinker II [%] |
|---|---|---|---|---|---|
| Z.1.1 | TnBT | 1.7 | 98.3 | | |
| Z1.2 | S23 | 1.2 | 98.8 | | |
| Z1.3 | S21 | 2.5 | 97.5 | | |
| Z1.4 | S21 | 2.0 | 98.0 | | |
| Z1.5 | S25 | 1.5 | 98.5 | | |
| Z1.6 | S25 | 1.0 | 99.0 | | |
| Z1.7 | S25 | 0.5 | 99.5 | | |
| Z1.8 | S27 | 0.5 | 99.5 | | |
| Z1.9 | S27 | 1.0 | 99.0 | | |
| Z1.10 | S14 | 1.0 (as 50 percent solution in xylene) | 99.0 | | |
| Z1.11 | S17 | 1.0 | 99.0 | | |
| Z1.12 | S17 | 1.5 | 98.5 | | |
| Z1.13 | S31 | 1.5 | 98.5 | | |
| | | Cat. [%] | Resin 2 [%] | | |
| Z2.1 | S17 | 1.5 | 98.5 | | |
| Z2.2 | S31 | 2.0 | 98.0 | | |
| Z2.3 | S25 | 1.5 | 98.5 | | |
| Z2.4 | S27 | 1.0 | 99.0 | | |
| | | Cat. [%] | Resin 3 [%] | PTMS [%] | |
| Z3.1 | S23 | 1.2 | 69.16 | 29.64 | |
| Z3.2 | S23 | 2.7 | 68.11 | 29.19 | |
| Z3.3 | S21 | 2.5 | 48.75 | 48.75 | |
| Z3.4 | S21 | 2.0 | 49.00 | 49.00 | |
| Z3.5 | S25 | 1.5 | 49.25 | 49.25 | |
| Z3.6 | S14 | 1.5 | 49.25 | 49.25 | |
| Z3.7 | S14 | 1.0 (as 50 percent solution in xylene) | 49.50 | 49.50 | |
| Z3.8 | S17 | 2.0 | 49.00 | 49.00 | |
| Z3.9 | S17 | 3.0 | 48.50 | 48.50 | |
| Z3.10 | S31 | 2.0 | 49.00 | 49.00 | |
| Z3.11 | S31 | 3.0 | 48.50 | 48.50 | |
| Z3.12 | S26 | 3.0 | 48.50 | 48.50 | |
| Z3.13 | S27 | 1.0 | 49.50 | 49.50 | |
| Z3.14 | S27 | 1.5 | 49.25 | 49.25 | |
| | | Cat. [%] | Resin 4 [%] | PTMS [%] | MTMS [%] |
| Z4.1 | S17 | 3.0 | 97.0 | | |
| Z4.2 | S31 | 3.0 | 97.0 | | |
| Z4.3 | S23 | 2.7 | 97.3 | | |
| Z4.4 | S21 | 2.5 | 97.5 | | |
| Z4.5 | S17 | 2.0 | 68.6 | | 29.4 |
| Z4.6 | S17 | 3.0 | 67.9 | | 29.1 |
| Z4.7 | S31 | 2.0 | 68.6 | | 29.4 |
| Z4.8 | S31 | 3.0 | 67.9 | | 29.1 |
| Z4.9 | S17 | 2.0 | 68.6 | 29.4 | |
| Z4.10 | S17 | 3.0 | 67.9 | 29.1 | |
| Z4.11 | S31 | 2.0 | 68.6 | 29.4 | |
| Z4.12 | S31 | 3.0 | 67.9 | 29.1 | |
| Z4.13 | TnBT | 1.7 | 98.3 | | |

TABLE 1-continued

Compositions (the percentage figures are wt % based on the overall mixture, catalyst solvents where appropriate are disregarded); apart from Z1.1, Z4.13 and Z9.13, all of the compositions are inventive.

| Composition | Catalyst | | Binder | Crosslinker I | Crosslinker II |
|---|---|---|---|---|---|
| | | Cat. [%] | Resin 5 [%] | PTMS [%] | |
| Z5.1 | S17 | 2.0 | 98.0 | | |
| Z5.2 | S31 | 2.0 | 98.0 | | |
| Z5.3 | S23 | 2.0 | 98.0 | | |
| Z5.4 | S21 | 2.0 | 98.0 | | |
| Z5.5 | S17 | 2.0 | 68.6 | 29.4 | |
| Z5.6 | S31 | 2.0 | 68.6 | 29.4 | |
| Z5.7 | S23 | 2.0 | 68.6 | 29.4 | |
| Z5.8 | S21 | 2.0 | 68.6 | 29.4 | |
| Z5.9 | S17 | 2.0 | 68.6 | | 29.4 |
| Z5.10 | S31 | 2.0 | 68.6 | | 29.4 |
| Z5.11 | S23 | 2.5 | 68.25 | | 29.25 |
| Z5.12 | S21 | 2.5 | 68.25 | | 29.25 |
| | | Cat. [%] | Resin 6 [%] | PTMS [%] | |
| Z6.1 | S17 | 1.2 | 49.4 | 49.4 | |
| Z6.2 | S17 | 2.0 | 49.0 | 49.0 | |
| Z6.3 | S31 | 1.6 | 49.2 | 49.2 | |
| Z6.4 | S31 | 2.0 | 49.0 | 49.0 | |
| Z6.5 | S23 | 2.7 | 48.65 | 48.65 | |
| Z6.6 | S21 | 2.5 | 48.75 | 48.75 | |
| | | Cat. [%] | Resin 7 [%] | PTEOS [%] | TEOS [%] |
| Z7.1 | S17 | 2.0 | 49.0 | 24.5 | 24.5 |
| Z7.2 | S17 | 2.5 | 48.75 | 24.37 | 24.37 |
| Z7.3 | S17 | 3.0 | 48.5 | 24.25 | 24.25 |
| Z7.4 | S31 | 2.0 | 49.0 | 24.5 | 24.5 |
| Z7.5 | S31 | 3.0 | 48.5 | 24.25 | 24.25 |
| | | Cat. [%] | Resin 7 [%] | Propyltriethoxysilane [%] | TEOS [%] |
| Z7.6 | S17 | 2.0 | 49.0 | 24.5 | 24.5 |
| Z7.7 | S17 | 3.0 | 48.5 | 24.25 | 24.25 |
| Z7.8 | S31 | 3.0 | 48.5 | 24.25 | 24.25 |
| | | Cat. [%] | Resin 8 [%] | | TEOS [%] |
| Z8.1 | S17 | 2.0 | 49.0 | | 49.0 |
| Z8.2 | S17 | 3.0 | 48.5 | | 48.5 |
| | | Cat. [%] | Resin 8 [%] | PTEOS [%] | TEOS [%] |
| Z8.3 | S17 | 2.0 | 49.0 | 24.5 | 24.5 |
| Z8.4 | S17 | 3.0 | 48.5 | 24.25 | 24.25 |
| | | Cat. [%] | Resin 9 [%] | PTMS [%] | MTMS [%] |
| Z9.1 | S17 | 2.0 | 68.6 | | 29.4 |
| Z9.2 | S17 | 3.0 | 67.9 | | 29.1 |
| Z9.3 | S31 | 2.0 | 68.6 | | 29.4 |
| Z9.4 | S31 | 3.0 | 67.9 | | 29.1 |
| Z9.5 | S17 | 2.0 | 68.6 | 29.4 | |
| Z9.6 | S17 | 3.0 | 67.9 | 29.1 | |
| Z9.7 | S31 | 2.0 | 68.6 | 29.4 | |
| Z9.8 | S31 | 3.0 | 67.9 | 29.1 | |
| | | Cat. [%] | Resin 9 [%] | TEOS [%] | |
| Z9.9 | S17 | 2.0 | 68.6 | 29.4 | |
| Z9.10 | S17 | 3.0 | 67.9 | 29.1 | |
| Z9.11 | S31 | 2.0 | 68.6 | 29.4 | |
| Z9.12 | S31 | 3.0 | 67.9 | 29.1 | |
| Z9.13 | TnBT | 1.7 | 68.8 | 29.5 | |
| | | Amount [%] | Resin 10 [%] | PTMS [%] | MTMS [%] |
| Z10.1 | S17 | 2.0 | 98.0 | | |
| Z10.2 | S17 | 3.0 | 97.0 | | |
| Z10.3 | S31 | 2.0 | 98.0 | | |

TABLE 1-continued

Compositions (the percentage figures are wt % based on the overall mixture, catalyst solvents where appropriate are disregarded); apart from Z1.1, Z4.13 and Z9.13, all of the compositions are inventive.

| Composition | Catalyst | | Binder | Crosslinker I | Crosslinker II |
|---|---|---|---|---|---|
| Z10.4 | S31 | 3.0 | 97.0 | | |
| Z10.5 | S17 | 2.0 | 68.6 | | 29.4 |
| Z10.6 | S17 | 3.0 | 67.9 | | 29.1 |
| Z10.7 | S31 | 2.0 | 68.6 | | 29.4 |
| Z10.8 | S31 | 3.0 | 67.9 | | 29.1 |
| Z10.9 | S17 | 2.0 | 49.0 | 49.0 | |
| Z10.10 | S17 | 3.0 | 48.5 | 48.5 | |
| Z10.11 | S31 | 2.0 | 49.0 | 49.0 | |
| Z10.12 | S31 | 3.0 | 48.5 | 48.5 | |
| | | Amount [%] | Resin 6 [%] | Resin 1 [%] | |
| Z11.1 | S17 | 2.0 | 49.0 | 49.0 | |
| Z11.2 | S31 | 2.0 | 49.0 | 49.0 | |
| | | Amount [%] | Resin 7 [%] | Resin 1 [%] | |
| Z12.1 | S17 | 2.0 | 49.0 | 49.0 | |
| Z12.2 | S17 | 3.0 | 48.5 | 48.5 | |
| Z12.3 | S31 | 2.0 | 49.0 | 49.0 | |
| Z12.4 | S31 | 3.0 | 48.5 | 48.5 | |

Example 3: Use

The drying times of certain compositions according to Table 1 were investigated in the form of coating materials, using the Drying Recorder (model BK3). The results are shown in Table 2.

TABLE 2

Drying times of the inventive compositions according to Example 2

| Composition | Initial drying [h] | Volume drying [h] |
|---|---|---|
| Z1.1 | 1.0 | 1.2 |
| Z1.2 | <0.5 | 0.5 |
| Z1.3 | 0.8 | 0.8 |
| Z1.4 | 1.2 | 1.6 |
| Z1.5 | 0.3 | 0.3 |
| Z1.6 | 0.5 | 0.5 |
| Z1.7 | 1.0 | 1.0 |
| Z1.8 | 0.8 | 2.4 |
| Z1.9 | 0.5 | 1.0 |
| Z1.10 | 1.0 | 1.5 |
| Z1.11 | <0.5 | <0.5 |
| Z1.12 | <0.5 | <0.5 |
| Z1.13 | <0.5 | <0.5 |
| Z2.1 | <0.5 | 0.8 |
| Z2.2 | <0.5 | 1.0 |
| Z2.3 | 0.8 | 2.0 |
| Z2.4 | 1.0 | 1.5 |
| Z3.1 | 1.5 | 10.5 |
| Z3.2 | <0.5 | 1.6 |
| Z3.3 | 1.2 | 2.4 |
| Z3.4 | 1.6 | 3.0 |
| Z3.5 | 0.8 | 2.0 |
| Z3.6 | 0.8 | 1.6 |
| Z3.7 | 1.0 | 1.5 |
| Z3.8 | 0.8 | 1.5 |
| Z3.9 | 0.5 | 0.8 |
| Z3.10 | 0.5 | 1.0 |
| Z3.11 | <0.5 | 0.8 |
| Z3.12 | 1.6 | 2.0 |
| Z3.13 | 2.4 | 4.8 |
| Z3.14 | 1.2 | 2.4 |
| Z4.1 | 2.4 | 5.0 |
| Z4.2 | 4.0 | 5.0 |
| Z4.3 | 9.0 | 14.0 |
| Z4.4 | 9.0 | 12.0 |
| Z4.5 | 1.8 | 2.6 |
| Z4.6 | 1.2 | 2.0 |
| Z4.7 | 2.4 | 4.0 |
| Z4.8 | 0.8 | 2.7 |
| Z4.9 | 1.5 | 3.0 |
| Z4.10 | 1.2 | 2.4 |
| Z4.11 | 2.6 | 5.0 |
| Z4.12 | 1.2 | 2.4 |
| Z4.13 | No drying | No drying |
| Z5.1 | <0.5 | 1.0 |
| Z5.2 | <0.5 | 0.8 |
| Z5.3 | 1.0 | 1.8 |
| Z5.4 | 0.8 | 1.5 |
| Z5.5 | <0.5 | 0.8 |
| Z5.6 | 0.5 | 1.0 |
| Z5.7 | 1.0 | 2.5 |
| Z5.8 | 0.8 | 1.5 |
| Z5.9 | <0.5 | 0.5 |
| Z5.10 | <0.5 | <0.5 |
| Z5.11 | <0.5 | 1.0 |
| Z5.12 | <0.5 | 1.4 |
| Z6.1 | <0.5 | 1.2 |
| Z6.2 | 0.8 | 1.5 |
| Z6.3 | 0.2 | 1.2 |
| Z6.4 | 0.5 | 1.5 |
| Z6.5 | 1.5 | 3.5 |
| Z6.6 | 0.8 | 3.5 |
| Z7.1 | <0.5 | 8.0 |
| Z7.2 | <0.5 | 4.0 |
| Z7.3 | <0.5 | 2.8 |
| Z7.4 | 5.5 | 10.0 |
| Z7.5 | 3.6 | 6.4 |
| Z7.6 | 0.5 | 4.5 |
| Z7.7 | 0.5 | 4.0 |
| Z7.8 | 0.5 | 5.0 |
| Z8.1 | <0.5 | 0.5 |
| Z8.2 | <0.5 | 0.5 |
| Z8.3 | <0.5 | 4.0 |
| Z8.4 | <0.5 | 3.2 |
| Z9.1 | 1.0 | 1.3 |
| Z9.2 | 0.5 | 1.0 |

TABLE 2-continued

Drying times of the inventive compositions according to Example 2

| Composition | Initial drying [h] | Volume drying [h] |
|---|---|---|
| Z9.3 | 1.5 | 4.0 |
| Z9.4 | 1.0 | 2.0 |
| Z9.5 | 1.0 | 2.0 |
| Z9.6 | 0.5 | 1.5 |
| Z9.7 | 1.5 | 3.0 |
| Z9.8 | 1.0 | 2.5 |
| Z9.9 | 0.8 | 1.0 |
| Z9.10 | 0.5 | 1.0 |
| Z9.11 | 1.0 | 4.0 |
| Z9.12 | 1.0 | 2.5 |
| Z9.13 | 1.0 | >24 |
| Z10.1 | 4.0 | 5.0 |
| Z10.2 | 2.5 | 4.0 |
| Z10.3 | 5.5 | 9.5 |
| Z10.4 | 5.0 | 6.5 |
| Z10.5 | 2.0 | 3.2 |
| Z10.6 | 1.2 | 2.0 |
| Z10.7 | 3.0 | 5.0 |
| Z10.8 | 1.2 | 2.8 |
| Z10.9 | 1.2 | 4.5 |
| Z10.10 | 1.2 | 2.5 |
| Z10.11 | 1.6 | 3.2 |
| Z10.12 | 1.2 | 2.0 |
| Z11.1 | <0.5 | <0.5 |
| Z11.2 | <0.5 | <0.5 |
| Z12.1 | 2.3 | 3.8 |
| Z12.2 | 1.6 | 2.0 |
| Z12.3 | 4.0 | 10.0 |
| Z12.4 | 1.6 | 2.9 |

The results of Example 3 show that the compositions of the invention are suitable as coating materials.

In the case of polysiloxanes containing aryl groups, the titanates lead either not at all or only very slowly to a curing via hydrolysis/condensation reactions.

The drying times of the compositions of the invention are comparable to or better than those from the prior art.

The surfaces of all cured compositions according to the invention are consistently hard.

The invention claimed is:

1. A composition, comprising:
   (a) a binder comprising at least one alkoxy-functional polysiloxane; and
   (b) at least one crosslinking catalyst which is a silicon-containing guanidine moiety of formula (IVa), (IVb) or (IVc):

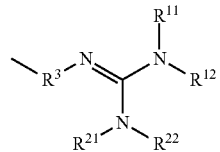

formula (IVa)

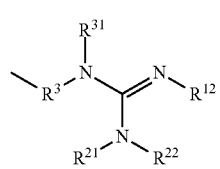

formula (IVb)

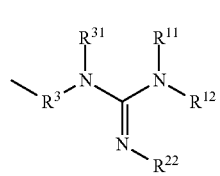

formula (IVc)

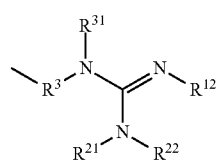

wherein:
$R^3$ are divalent radicals which, independently of one another, are identical or different linear or branched hydrocarbon radicals containing 1 to 50 carbon atoms, and which may be interrupted by at least one heteroatom, and/or may be substituted by at least one hydroxyl radical, at least one amino radical, or a mixture thereof;
$R^{11}$, $R^{12}$, $R^{21}$, $R^{22}$ and $R^{31}$ independently of one another, are identical or different and are hydrogen, linear or branched or cyclic hydrocarbons containing 1 to 15 carbon atoms, it being possible for the hydrocarbons also to contain 1 or 2 heteroatoms;
a silicon compound is bonded to $R^3$ via a Si atom,
wherein component b) further comprises at least one crosslinking catalyst of the formula (I):

$$M_a M^G_b D_c D^G_d T_e Q_f \quad (I),$$

wherein:
a=0 to 10,
b=0 to 10,
c=0 to 350,
d=0 to 50,
e=0 to 50,
f=0 to 10,
where the sum of the indices b and d is greater than or equal to 1 to 20,
with the proviso that when the index a is 2 and at the same time the sum of the indices b, c, e and f is zero, the index d is other than 1,
$M=[R_3SiO_{1/2}]$
$M^G=[R^G R_2 SiO_{1/2}]$,
$D=[R_2SiO_{2/2}]$,
$D^G=[R^G_2 SiO_{2/2}]$,
$T=[RSiO_{3/2}]$,
$Q=[SiO_{4/2}]$,
R are, independently of one another, identical or different and are $OR^a$ groups and/or linear or branched, saturated or else mono- or polyunsaturated hydrocarbon radicals, which may be interrupted by heteroatoms and/or may be substituted one or more times by hydroxyl, amino, carboxyl or aryl radicals,
$R^a$ is identical or different and is hydrogen and/or alkyl groups having 1 to 12 carbon atoms,
$R^G$ is a radical containing guanidine groups and of the formula (IVa), (IVb) or (IVc), the tautomers and/or salts thereof, -continued

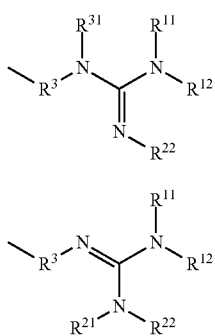

formula (IVb)

formula (IVc)

R³ are divalent radicals which, independently of one another, are identical or different, linear or branched hydrocarbon radicals containing 1 to 50 carbon atoms, and may be interrupted by heteroatoms, and $R^{11}$, $R^{12}$, $R^{21}$, $R^{22}$ and $R^{31}$ are, independently of one another, identical or different and are hydrogen, linear or branched or cyclic hydrocarbons containing 1 to 15 carbon atoms, it being possible for the hydrocarbons also to contain 1 or 2 heteroatoms, wherein the alkoxy-functional polysiloxane of component (a) satisfies the general formula (II):

(II), wherein:

a and b independently of one another are greater than 0 to less than 2,

R are, independently of one another, identical or different, linear or branched, saturated or else mono- or polyunsaturated or aromatic hydrocarbon radicals, and R' is an alkyl group consisting of 1 to 8 carbon atoms.

2. The composition of claim 1, further comprising:
(c) an alkoxysilane as a crosslinker component.

3. The composition according to claim 2, wherein the alkoxysilane (c) is a silane of the formula (III):

$$R_a Si(OR')_b \qquad (III),$$

wherein:

a and b independently of one another are greater than 0 to less than 2, and the sum of a+b is 4, R is an alkyl group or cycloalkyl group consisting of 1 to 8 carbon atoms, or an aromatic moiety having 6 to 20 carbon atoms, and R' is an alkyl group consisting of 1 to 8 carbon atoms.

4. The composition of claim 1, further comprising at least one additive.

5. A coating material, comprising the composition of claim 1.

6. A method, comprising curing the composition of claim 1 at room temperature and without addition of a metal-containing catalyst.

7. The method of claim 6, wherein the curing occurs in the presence of moisture.

* * * * *